(12) United States Patent
Yamazaki

(10) Patent No.: US 9,566,566 B2
(45) Date of Patent: Feb. 14, 2017

(54) HYDROGEN PRODUCTION CATALYST, METHOD FOR PRODUCING HYDROGEN AND HYDROGEN PRODUCTION APPARATUS USING THE SAME

(71) Applicant: KABUSHIKI KAISHA TOYOTA CHUO KENKYUSHO, Nagakute-shi, Aichi (JP)

(72) Inventor: Kiyoshi Yamazaki, Toyota (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 69 days.

(21) Appl. No.: 13/912,687

(22) Filed: Jun. 7, 2013

(65) Prior Publication Data

US 2013/0336879 A1    Dec. 19, 2013

(30) Foreign Application Priority Data

Jun. 13, 2012 (JP) ................................ 2012-134169
May 8, 2013 (JP) ................................ 2013-098358

(51) Int. Cl.
| | |
|---|---|
| *B01J 23/10* | (2006.01) |
| *C01B 3/06* | (2006.01) |
| *C01B 3/04* | (2006.01) |
| *B01J 37/03* | (2006.01) |
| *B01J 37/08* | (2006.01) |
| *B01J 37/12* | (2006.01) |
| *B01J 37/16* | (2006.01) |
| *B01J 35/00* | (2006.01) |
| *B01J 35/02* | (2006.01) |

(Continued)

(52) U.S. Cl.
CPC ............... *B01J 23/10* (2013.01); *B01J 35/002* (2013.01); *B01J 35/023* (2013.01); *B01J 35/1014* (2013.01); *B01J 35/1038* (2013.01); *B01J 37/0009* (2013.01); *B01J 37/031* (2013.01); *B01J 37/08* (2013.01); *B01J 37/12* (2013.01); *B01J 37/16* (2013.01); *C01B 3/042* (2013.01); *C01B 3/061* (2013.01); *B01J 2523/00* (2013.01); *Y02E 60/364* (2013.01)

(58) Field of Classification Search
CPC ...................................................... B01J 23/10
See application file for complete search history.

(56) References Cited

U.S. PATENT DOCUMENTS

2005/0282701 A1* 12/2005 Foong .................. B01D 53/945
                                                          502/304
2006/0009353 A1*  1/2006 Cai et al. ....................... 502/341
(Continued)

FOREIGN PATENT DOCUMENTS

WO    WO 2008/156219    * 12/2008

OTHER PUBLICATIONS

Novel Oxides for Cycled Hydrogen Production from Methane and Water Using a Temperature Swing Advanced Materials, vol. 15, No. 6, pp. 521-526, 2003 Zhenchuan Kang et al.*

(Continued)

*Primary Examiner* — Melvin C Mayes
*Assistant Examiner* — Douglas B Call
(74) *Attorney, Agent, or Firm* — Oliff PLC

(57) ABSTRACT

A hydrogen production catalyst used for generating hydrogen by splitting water, the catalyst comprising a composite metal oxide of cerium oxide and praseodymium oxide.

12 Claims, 8 Drawing Sheets

(51) Int. Cl.
  *B01J 35/10* (2006.01)
  *B01J 37/00* (2006.01)

(56) References Cited

U.S. PATENT DOCUMENTS

| | | | |
|---|---|---|---|
| 2006/0172886 A1* | 8/2006 | Shimazu et al. | 502/325 |
| 2009/0232728 A1* | 9/2009 | Wagner et al. | 423/648.1 |
| 2010/0329954 A1* | 12/2010 | Yokota | B01D 53/945 423/213.2 |
| 2013/0319501 A1* | 12/2013 | Hilliard | 136/246 |

OTHER PUBLICATIONS

Kaneko et al., "Reactive ceramics of $CeO_2$—$MO_x$(M=Mn, Fe, Ni, Cu) for $H_2$ generation by two-step water splitting using concetrated solar energy," *Energy*, 2007, pp. 656-663, vol. 32.

Meng et al., "Reactivity of $CeO_2$-based ceramics for solar hydrogen production via a two-step water-splitting cycle with concentrated solar energy," *International Journal of Hydrogen Energy*, 2011, pp. 13435-13441, vol. 36.

Singh et al., "$Ce_{0.67}Cr_{0.33}O_{2.11}$: A New Low-Temperature $O_2$ Evolution Material and $H_2$ Generation Catalyst by Thermochemical Splitting of Water," *Chemistry of Materials*, 2010, pp. 762-768, vol. 22.

Jun. 4, 2015 Office Action issued in Japanese Application No. 2013-098358.

Meng et al., "Solar thermochemical process for hydrogen production via two-step water splitting cycle based on Ce1—xPrxO2-d redox reaction", Thermochimica Acta, vol. 532, pp. 134-138, 2012.

\* cited by examiner

HYDROGEN PRODUCTION CATALYST, METHOD FOR PRODUCING HYDROGEN AND HYDROGEN PRODUCTION APPARATUS USING THE SAME

BACKGROUND OF THE INVENTION

Field of the Invention

The present invention relates to a hydrogen production catalyst, a method for producing hydrogen and a hydrogen production apparatus using the hydrogen production catalyst.

Related Background Art

Conventionally, a method (a method utilizing a two-step thermochemical water splitting reaction involving oxidation and reduction reactions of cerium oxide) has been studied in which hydrogen is generated by using a composite metal oxide containing cerium oxide as a hydrogen production catalyst, and performing a step of reducing the composite metal oxide to thereby release oxygen, and a step of splitting water by bringing water into contact with the reduced composite metal oxide to thereby oxidize the composite metal oxide and generate hydrogen.

The following are examples of hydrogen production catalysts used in this method. Specifically, a paper of Kaneko et al. (Non-Patent Literature 1: Kaneko et al., "Reactive ceramics of $CeO_2$-$MO_x$ (M=Mn, Fe, Ni, Cu) for $H_2$ generation by two-step water splitting using concentrated solar thermal energy", Energy, 2007, vol. 32, P. 656 to P. 663) discloses the use of a composite metal oxide of $CeO_2$ with a metal oxide represented by the formula: $MO_x$ (M=Mn, Fe, Ni, Cu). Moreover, a paper of Qing-Long Meng et al. (Non-Patent Literature 2: Qing-Long Meng et al., "Reactivity of $CeO_2$-based ceramics for solar hydrogen production via a two-step water-splitting cycle with concentrated solar energy", International Journal of Hydrogen Energy, 2011, vol. 36, P. 13435 to P. 13441) discloses the use of a composite metal oxide represented by the formula $Ce_{0.9}M_{0.1}O_{2-\delta}$ (M=Mg, Ca, Sr, Sc, Y, Dy, Zr, Hf) as a hydrogen production catalyst. Furthermore, a paper of M. S. Hegde (Non-Patent Literature 3: M. S. Hegde, "$Ce_{0.67}Cr_{0.33}O_{2.11}$: A New Low-Temperature $O_2$ Evolution Material and $H_2$ Generation Catalyst by Thermochemical Splitting of Water", Chem. Mater, 2010, vol. 22, P. 762 to P. 768) discloses the use of a composite metal oxide represented by the formula: $Ce_{0.67}Cr_{0.33}O_{2.11}$ as a hydrogen production catalyst.

SUMMARY OF THE INVENTION

However, when a conventional composite metal oxide as described in Non-Patent Literature 1 or 2 is used as a hydrogen production catalyst, the step of reducing the composite metal oxide to thereby release oxygen is performed under a high-temperature condition of 1300° C. or above. The reaction vessel for performing this step necessitates the use of a special material having high heat resistance. Hence, these composite metal oxides are not necessarily sufficient in terms of practicability. Meanwhile, presumably, a conventional composite metal oxide as described in Non-Patent Literature 3 is prone to thermal degradation (particle growth). Hence, the composite metal oxide easily degrades in a case, for example, where the reduction step and the oxidation step of the catalyst involving heat application are performed repeatedly. Therefore, it is difficult to cause these steps to proceed efficiently in some cases, and the composite metal oxide is not necessarily sufficient in terms of practicability.

The present invention has been made in view of the above-described problems of the conventional technologies. An object of the present invention is to provide a hydrogen production catalyst which makes it possible to efficiently perform a thermal reduction step and an oxidation step of the catalyst and produce hydrogen efficiently and reliably in a relatively low-temperature region of 900° C. or below, as well as a method for producing hydrogen and a hydrogen production apparatus using the hydrogen production catalyst.

The present inventors have conducted earnest study to achieve the above object. As a result, the present inventors have found that employment of a hydrogen production catalyst used for generating hydrogen by splitting water comprising a composite metal oxide of cerium oxide and praseodymium oxide makes it possible to efficiently perform a thermal reduction step and an oxidation step of the catalyst and produce hydrogen efficiently and reliably in a relatively low-temperature region of 900° C. or below. This finding has led to the completion of the present invention.

Specifically, a hydrogen production catalyst of the present invention is a hydrogen production catalyst used for generating hydrogen by splitting water, the catalyst comprising a composite metal oxide of cerium oxide and praseodymium oxide.

In the hydrogen production catalyst of the present invention, a content ratio of the cerium oxide and the praseodymium oxide in the composite metal oxide is preferably 95:5 to 5:95 in terms of an atomic ratio ([cerium]:[praseodymium]) of the metal elements.

In addition, in the hydrogen production catalyst of the present invention, the composite metal oxide preferably further comprises aluminum oxide. In this case, it is more preferable that a content of the aluminum oxide be 5 to 50% by mass relative to a total amount of the cerium oxide, the praseodymium oxide, and the aluminum oxide.

Moreover, the hydrogen production catalyst of the present invention is preferably such that an average primary particle diameter of the composite metal oxide is 1 to 100 nm.

Furthermore, the hydrogen production catalyst of the present invention is preferably such that after heated in an inert gas atmosphere at 800° C. for 1 hour, the composite metal oxide has an average primary particle diameter of 15 nm or less.

Moreover, the hydrogen production catalyst of the present invention is preferably such that after calcined in air at 1100° C. for 5 hours, the composite metal oxide satisfies the following conditions:

a total pore volume of pores having pore diameters in a range from 1 nm to 0.1 μm measured by a nitrogen adsorption method is 0.18 cm$^3$/g or more; and a total pore volume of pores having pore diameters in a range from 0.1 μm to 10 μm measured by a mercury intrusion method is 0.2 cm$^3$/g or more.

Meanwhile, a method for producing hydrogen of the present invention is a method in which the hydrogen production catalyst of the present invention is used, the method comprising:

a step (A) of thermally reducing the hydrogen production catalyst; and a step (B) of splitting water by bringing water into contact with the hydrogen production catalyst reduced in the step (A), to thereby generate hydrogen and oxidize the hydrogen production catalyst.

In the method for producing hydrogen of the present invention, the step (A) is preferably a step of thermally reducing the hydrogen production catalyst in an inert gas atmosphere under a temperature condition of 400 to 900° C.

In addition, in the method for producing hydrogen of the present invention, the water is preferably brought into contact with the hydrogen production catalyst under a temperature condition of 50 to 600° C. in the step (B).

Meanwhile, a hydrogen production apparatus of the present invention comprises:

the hydrogen production catalyst of the present invention;

a reaction vessel in which the hydrogen production catalyst is placed;

water supply means connected to the reaction vessel for supplying water into the reaction vessel;

inert gas supply means connected to the reaction vessel for supplying an inert gas into the reaction vessel;

an exhaust pipe connected to the reaction vessel for discharging gas in the reaction vessel; and heating means for heating the inside of the reaction vessel, wherein the hydrogen production apparatus is configured to produce hydrogen by performing, in the reaction vessel, a step (A) of thermally reducing the hydrogen production catalyst, and a step (B) of splitting water by bringing water into contact with the hydrogen production catalyst reduced in the step (A), to thereby generate hydrogen and oxidize the hydrogen production catalyst.

In the hydrogen production apparatus of the present invention, the heating means is preferably heating means for heating the inside of the reaction vessel by utilizing heat of sunlight.

Note that although it is not exactly clear why the above object is achieved by the hydrogen production catalyst of the present invention and the method for producing hydrogen and the hydrogen production apparatus using the hydrogen production catalyst, the present inventors speculates as follows. Specifically, the hydrogen production catalyst of the present invention comprises a composite metal oxide of cerium oxide and praseodymium oxide. In addition, such a hydrogen production catalyst is capable of generating hydrogen efficiently by performing the step (A) of thermally reducing the hydrogen production catalyst, and the step (B) of splitting water by bringing water into contact with the hydrogen production catalyst reduced in the step (A), to thereby generate hydrogen and oxidize the hydrogen production catalyst. Here, a case where cerium oxide alone is used is first discussed. When cerium oxide is thermally reduced under a relatively low-temperature condition of 900° C. or below, cerium in the oxide is not reduced from the tetravalent state to the trivalent state. For this reason, the thermal reduction step of the catalyst using cerium oxide alone does not proceed sufficiently under a relatively low-temperature condition of 900° C. or below, and the step (A) of thermally reducing the catalyst cannot be performed efficiently. A case where praseodymium oxide is used alone is also discussed. When praseodymium oxide is thermally reduced under a relatively low-temperature condition of 900° C. or below, praseodymium in the oxide is reduced relatively easily form the tetravalent state to the trivalent state. For this reason, when praseodymium oxide alone is used as the catalyst, the step of thermally reducing the catalyst can be performed efficiently. However, praseodymium is stable in the trivalent state. Hence, when praseodymium oxide alone is used as the catalyst, water cannot be split efficiently upon contact with the catalyst after the thermal reduction. Thus, the reoxidation and the hydrogen generation occurring with water splitting cannot be caused to proceed efficiently. For example, under a temperature condition of 600° C. or below, the water splitting does not proceed when water is brought into contact with the praseodymium oxide after the thermal reduction, and the reoxidation of the praseodymium oxide and the hydrogen generation cannot be conducted. Thus, when praseodymium oxide alone is used as the catalyst, the step (B) of splitting water, to thereby generate hydrogen and oxidize the hydrogen production catalyst, cannot be caused to proceed efficiently. On the other hand, when the composite metal oxide comprising cerium oxide and praseodymium oxide used for the hydrogen production catalyst of the present invention is thermally reduced under a relatively low-temperature condition of 900° C. or below, not only praseodymium in the composite metal oxide is reduced from the tetravalent state to the trivalent state, but also cerium is easily reduced from the tetravalent state to the trivalent state because of interaction between cerium and praseodymium. For this reason, the hydrogen production catalyst comprising the composite metal oxide of cerium oxide and praseodymium oxide is capable of causing the step (A) to proceed sufficiently efficiently even under a relatively low-temperature condition of 900° C. or below. In addition, the valence of cerium in the thus reduced composite metal oxide takes a trivalent state. However, since the stability of cerium is poor in the trivalent state, cerium is easily oxidized into more stable tetravalent cerium with water in a case where water is brought into contact with the composite metal oxide. In addition, because of interaction between cerium and praseodymium, praseodymium is also more easily oxidized with water into the tetravalent state. Thus, when water is brought into contact with the composite metal oxide reduced in the step (A), the composite metal oxide is reoxidized efficiently. In addition, in the reoxidation, hydrogen is generated by water splitting occurring with the reoxidation. Thus, when the composite metal oxide of cerium oxide and praseodymium oxide is thermally reduced, and then water is brought into contact with the composite metal oxide, the oxidation of the composite metal oxide and the hydrogen generation can be caused to proceed efficiently. When the composite metal oxide of cerium oxide and praseodymium oxide is used as a hydrogen production catalyst as described above, the step (A) and the step (B) proceed efficiently even in a relatively low-temperature region of 900° C. or below. The present inventors speculate that, for this reason, the present invention makes it possible to efficiently split water and produce hydrogen efficiently and reliably even in a relatively low-temperature region of 900° C. or below.

As described above, in the present invention, the hydrogen production catalyst utilizing the interaction between cerium and praseodymium is used, so that the step (A) and the step (B) are caused to proceed efficiently, and water is efficiently split and hydrogen is produced efficiently and reliably even in a relatively low-temperature region of 900° C. or below. In addition, in the hydrogen production catalyst, when cerium oxide and praseodymium oxide are in a state (a highly dispersed state) of being mixed with each other at a higher degree of dispersion, the interaction between cerium and praseodymium is enhanced. Consequently, the above-described reduction of cerium from the tetravalent state to the trivalent state and the above-described reoxidation of praseodymium from the trivalent state to the tetravalent state by the reaction with water tend to be promoted. In addition, when cerium oxide and praseodymium oxide are in a state of being highly dispersed in each other, an oxide may be formed in which cerium oxide and praseodymium oxide are dissolved in each other to form a solid solution. This also enhances the interaction between cerium and praseodymium, so that the reduction of cerium from the tetravalent state to the trivalent state and reoxidation of praseodymium from the trivalent state to the tetravalent state by the reaction with water tend to be more promoted. For this reason, in the hydrogen production catalyst, cerium oxide and praseodymium oxide are preferably in the state (highly dispersed state) of being mixed with each other at a higher degree of dispersion. The present inventors speculate that, in this case, the reduction of cerium from the tetravalent state to the trivalent state and the reoxidation of praseodymium from the trivalent state to the tetravalent state by the reaction with water are more promoted, so that the generation efficiency of hydrogen tends to be further improved.

The present invention makes it possible to provide a hydrogen production catalyst which makes it possible to efficiently perform a thermal reduction step and an oxidation step of the catalyst and produce hydrogen efficiently and reliably in a relatively low-temperature region of 900° C. or below, as well as a method for producing hydrogen and a hydrogen production apparatus using the hydrogen production catalyst.

DETAILED DESCRIPTION OF THE PREFERRED EMBODIMENTS

Figure 1:
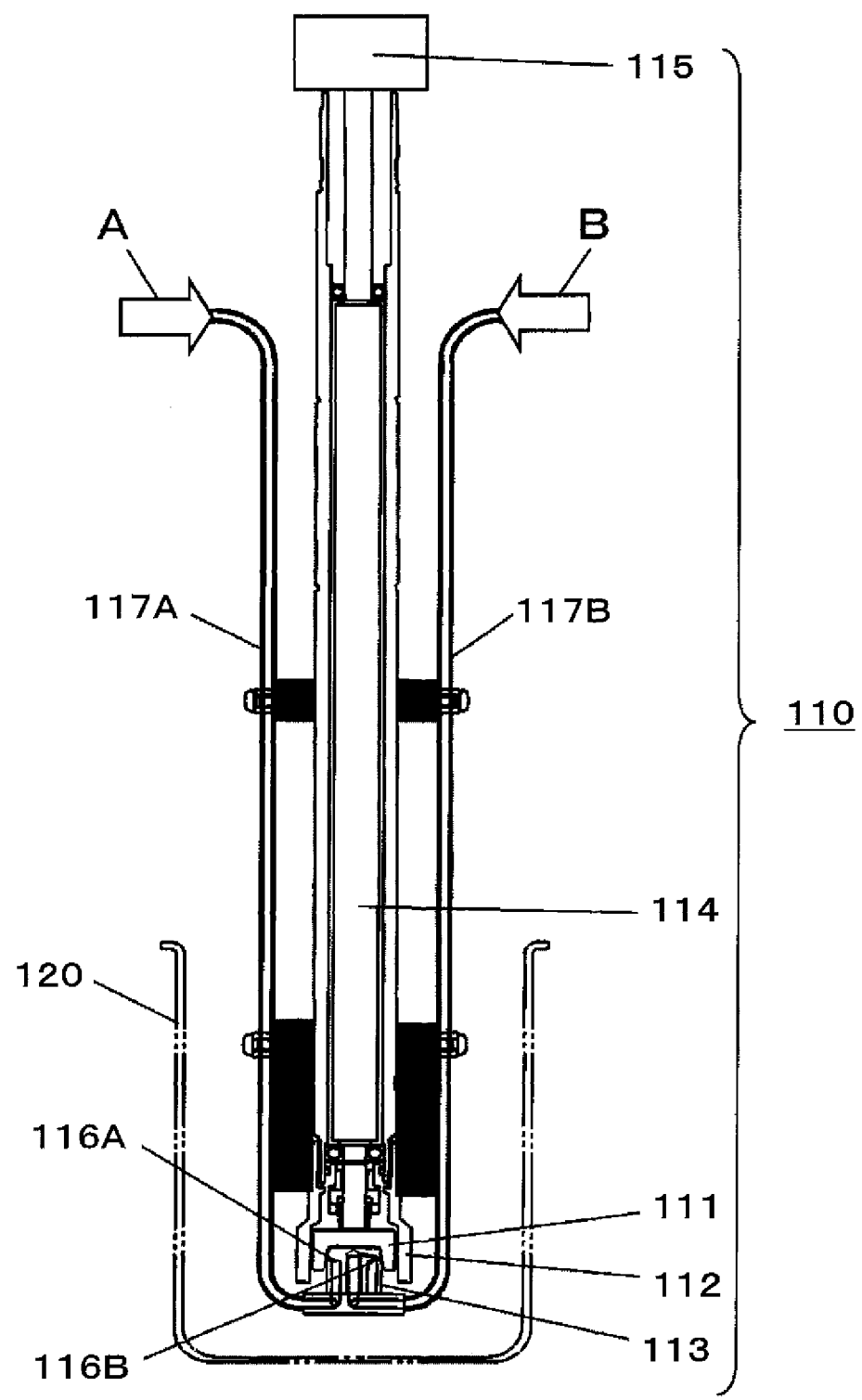
FIG. 1 is a schematic vertical cross-sectional view showing a preferred embodiment of an apparatus for producing a colloid solution used in the present invention.

Hereinafter, the present invention will be described in detail based on preferred embodiments thereof.

First, a hydrogen production catalyst of the present invention is described. Specifically, the hydrogen production catalyst of the present invention is a hydrogen production catalyst used for generating hydrogen by splitting water, the catalyst comprising a composite metal oxide of cerium oxide and praseodymium oxide.

The composite metal oxide comprises cerium oxide and praseodymium oxide. A content ratio of the cerium oxide to the praseodymium oxide in the composite metal oxide is preferably 95:5 to 5:95 (more preferably 90:10 to 10:90, and further preferably 90:10 to 50:50) in terms of an atomic ratio ([cerium (Ce)]:[praseodymium (Pr)]) of the metal elements constituting these oxides (in terms of an atomic ratio of the metal elements). If the content ratio of the cerium oxide (the atomic ratio of cerium) is less than the lower limit, the amount of hydrogen generated tends to decrease, because the amount of cerium involved in the water splitting in the step (B) decreases. Meanwhile, if the content ratio of the cerium oxide exceeds the upper limit, the ratio of cerium reduced into the trivalent state in the step (A) decreases, so that the amount of hydrogen generated in the step (B) tends to decrease. Note that the atomic ratio can be determined by ICP (high-frequency inductively coupled plasma) emission spectroscopy.

In addition, the total amount of the cerium oxide and the praseodymium oxide in the composite metal oxide is preferably 50% by mass or more. A lower limit value of the total amount of the cerium oxide and the praseodymium oxide is more preferably 60% by mass, further preferably 65% by mass, particularly preferably 70% by mass, and most preferably 80% by mass. Meanwhile, an upper limit value of the total amount of the cerium oxide and the praseodymium oxide is preferably 100% by mass, and more preferably 95% by mass. If the total amount of the cerium oxide and the praseodymium oxide is less than the lower limit, the ratio of the amount of hydrogen generated relative to the weight of the sample as a whole tends to decrease.

Moreover, the composite metal oxide of cerium oxide and praseodymium oxide preferably further comprises aluminum oxide, in addition to the cerium oxide and the praseodymium oxide. The inclusion of aluminum oxide makes it possible to suppress the thermal degradation (particle growth) of cerium oxide, praseodymium oxide, or the composite oxide comprising cerium and praseodymium. In addition, when the composite metal oxide further comprises aluminum oxide as described above, the content of aluminum oxide is preferably 5 to 50% by mass (more preferably 5 to 40% by mass, and further preferably 5 to 35% by mass) relative to a total amount of the cerium oxide, the praseodymium oxide, and the aluminum oxide. If the content of aluminum oxide is less than the lower limit, the effect achieved by the inclusion of aluminum oxide (the effect of suppressing the thermal degradation (particle growth) of cerium oxide, praseodymium oxide, or the composite oxide comprising cerium and praseodymium) tends to be insufficient. Meanwhile, if the content of aluminum oxide exceeds the upper limit, the amount of hydrogen generated per weight of the composite metal oxide as a whole tends to decrease. Note that also when aluminum oxide is contained as described above, the content ratio of the cerium oxide to the praseodymium oxide in the composite metal oxide (the content ratio of the cerium oxide to the praseodymium oxide in the composite metal oxide excluding the content of aluminum oxide) is preferably 95:5 to 5:95 (more preferably 90:10 to 10:90, and further preferably 90:10 to 50:50) in terms of an atomic ratio ([cerium (Ce)]:[praseodymium (Pr)]) of the metal elements constituting the cerium oxide and the praseodymium oxide (in terms of an atomic ratio of the metal elements).

In addition, when the composite metal oxide comprises aluminum oxide, the content ratio of cerium oxide, praseodymium oxide, and aluminum oxide contained in the composite metal oxide is preferably 95(1−X):95X:5 to 50(1−Y):50Y:50, and more preferably 95(1−X):95X:5 to 65(1−Y):65Y:35 in terms of a mass ratio ([cerium oxide]:[praseodymium oxide]:[aluminum oxide]) (note that the value of X is preferably 0.05 to 0.95, and more preferably 0.1 to 0.9. Moreover, the value of Y is preferably 0.05 to 0.95, and more preferably 0.1 to 0.9). If the content ratio of aluminum oxide is less than the lower limit, the cerium oxide, the praseodymium oxide, or the composite oxide comprising cerium and praseodymium tends to thermally degrade. Meanwhile, if the content ratio of aluminum oxide exceeds the upper limit, the amount of hydrogen generated per weight of the composite metal oxide as a whole tends to decrease. In addition, if the content ratio of cerium oxide is less than the lower limit, the amount of hydrogen generated tends to decrease, because the amount of cerium involved in the water splitting in the step (B) decreases. Meanwhile, if the content ratio of cerium oxide exceeds the upper limit, the ratio of cerium reduced into the trivalent state in the step (A) decreases, so that the amount of hydrogen generated in the step (B) tends to decrease.

In addition, the composite metal oxide of cerium oxide and praseodymium oxide may further comprise oxides of other elements in addition to the above-described aluminum oxide, unless the effect is adversely affected. Examples of the other elements include silicon, titanium, gallium, germanium, yttrium, zirconium, indium, tin, lanthanum, hafnium, tantalum, and tungsten. Moreover, in addition to these oxides, the composite metal oxide may further comprise metal elements which are present in the metal states under the reaction conditions. Examples of these metal elements include ruthenium, rhodium, palladium, silver, iridium, platinum, and gold. Of these metal elements, rhodium, palladium, and platinum are preferable, and platinum is further preferable, from the viewpoints of oxygen release and promotion of reoxidation involving water splitting. Note that one of these metal elements can be used alone, or two or more thereof can be used in combination.

In addition, although the composite metal oxide is not particularly limited, the composite metal oxide preferably has a fluorite-type crystal structure from the viewpoint of ease of release and storage of oxygen in the crystal lattice. Note that the presence of the crystal structure can be verified, for example, as follows. Specifically, an X-ray diffraction pattern is obtained by employing the same method as the method for X-ray diffraction measurement for determination of the particle diameter which will be described later. Then, the X-ray diffraction pattern is compared with reference data from cerium oxide ($CeO_2$) or praseodymium oxide ($Pr_6O_{11}$) known to have a fluorite-type structure.

In addition, the composite metal oxide is more preferably in a powder form, because hydrogen can be produced more efficiently. When the composite metal oxide is in a powder form, an average primary particle diameter of particles of the composite metal oxide is preferably 1 to 100 nm. In addition, a lower limit value of the average primary particle diameter is more preferably 2 nm, and further preferably 5 nm. Furthermore, an upper limit value of the average primary particle diameter is more preferably 50 nm, and further preferably 15 nm. If the average primary particle diameter of particles of the composite metal oxide is less than the lower limit, particle growth due to sintering of particles (crystal particles) easily occurs in the step of producing hydrogen. Since the particles subjected to the particle growth are not capable of performing the reduction or the oxidation efficiently, the hydrogen production performance tends to deteriorate during use. Meanwhile, if the average primary particle diameter exceeds the upper limit, neither the step of thermally reducing the catalyst nor the step of generating hydrogen by using the reduced catalyst can be caused to proceed efficiently, so that the hydrogen production performance tends to deteriorate. Note that the "average primary particle diameter" herein refers to an average crystal particle diameter measured by an X-ray diffraction measurement. Specifically, the "average primary particle diameter" can be determined by conducting measurement based on X-ray diffraction (XRD), and calculation based on the Scherrer equation:

$$D = 0.9\lambda/\beta \cos\theta$$

(where D represents the particle diameter, $\lambda$ represents the wavelength of the X rays used, $\beta$ represents the diffraction line width of the sample, and $\theta$ represents the diffraction angle).

As a method for X-ray diffraction measurement for determining the particle diameter of the primary particles, a method is employed in which the measurement is carried out by using a measuring apparatus manufactured by Rigaku Corporation under the trade name of "RINT-TTR" under conditions of a scan step of 0.02°, divergence and scattering slits of ½ deg, receiving slit of 0.15 mm, $CuK\alpha$ radiation, 50 kV, 300 mA, and scans for 0.5 sec/point. In addition, the particle diameter is calculated from the diffraction line width of the peak (at around $2\theta=28.5°$) attributable to the (111) plane of the crystal. Note that the magnitude of the particle diameter can also be determined by observation with a transmission electron microscope (TEM).

Moreover, after heated in an inert gas (for example, Ar gas or the like) atmosphere at 800° C. for 1 hour, the composite metal oxide preferably has an average primary particle diameter (an average crystal particle diameter determined by the above-described X-ray diffraction measurement) of 15 nm or less (more preferably 1 nm to 15 nm, further preferably 2 to 15 nm, and particularly preferably 5 to 15 nm). If the average primary particle diameter after the heat treatment exceeds the upper limit, the reaction rate tends to decrease in each of the oxygen release in the thermal reduction step and the hydrogen generation in the oxidation step. Meanwhile, if the average primary particle diameter is less than the lower limit, particle growth due to sintering of particles occurs in the thermal reduction step, so that the oxygen release rate and the hydrogen generation rate tend to decrease.

In addition, a specific surface area of the composite metal oxide is preferably 1 to 200 $m^2/g$, and more preferably 5 to 150 $m^2/g$. If the specific surface area exceeds the upper limit, particle growth due to sintering of particles easily occurs in the step of producing hydrogen, so that the hydrogen production performance tends to deteriorate during the use. Meanwhile, if the specific surface area is less than the lower limit, there is a tendency that each of the step of thermally reducing the catalyst and the step of generating hydrogen cannot be caused to proceed efficiently. Note that the specific surface area can be calculated as a BET specific surface area from an adsorption isotherm curve by using the BET adsorption isotherm equation. In addition, the BET specific surface area can be determined by using a commercially available apparatus (for example, one manufactured by Micro Data Co., Ltd. under the trade name of "MS4232").

Moreover, after calcined in air at 1100° C. for 5 hours, the composite metal oxide preferably satisfies the following conditions: a total pore volume of pores having pore diameters in a range from 1 nm to 0.1 μm (mesopores) measured by a nitrogen adsorption method is 0.18 $cm^3/g$ or more; and a total pore volume of pores (macropores) having pore diameters in a range from 0.1 μm to 10 μm measured by a mercury intrusion method is 0.2 $cm^3/g$ or more. If any of the total pore volumes (in particular, the total pore volume of macropores) is less than the lower limit, the particle growth cannot be suppressed necessarily sufficiently in a case of exposure to high temperature, so that it tends to be difficult to maintain the catalytic activity sufficiently in some cases.

In addition, the upper limits of the total pore volumes are not particularly limited. However, the total pore volume of mesopores is preferably 3 cm$^3$/g or less, and the total pore volume of macropores is preferably 4 cm$^3$/g or less, from the viewpoint that a composite metal oxide with a large total pore volume is bulky, and hence the size of the catalytic reactor, which needs to be heated, is increased.

Note that the total pore volume of mesopores can be determined as follows. Specifically, first, after calcined in the air at 1100° C. for 5 hours, the composite metal oxide is cooled to the liquid nitrogen temperature (−196° C.), and nitrogen gas is introduced at a predetermined pressure. Then, the amount of nitrogen adsorbed at an equilibrium pressure is determined by the constant-volume gas adsorption method or the weight method. Next, the pressure of the nitrogen gas introduced is gradually increased, and the amount of nitrogen adsorbed is determined at each equilibrium pressure. The obtained amounts of nitrogen adsorbed are plotted against the equilibrium pressures to obtain a nitrogen adsorption isotherm curve. Subsequently, a pore diameter distribution curve is obtained from the obtained nitrogen adsorption isotherm curve by the BJH method, and the total pore volume of mesopores can be determined from the pore diameter distribution curve.

Meanwhile, the total pore volume of macropores can be determined by the mercury intrusion method. Specifically, after calcination in the air at 1100° C. for 5 hours, mercury is intruded into the porous composite metal oxide at high pressures, and the relationship between the applied pressures and the amounts of mercury intruded is found. The pore diameters are calculated from the applied pressures, and the pore volumes are calculated from the amounts of mercury intruded. A pore diameter distribution curve is obtained by plotting the pore diameters and the pore volumes, and the total pore volume of macropores can be determined from the pore diameter distribution curve.

A method for producing the composite metal oxide of cerium oxide and praseodymium oxide is not particularly limited, and a known production method capable of producing the composite metal oxide of cerium oxide and praseodymium oxide can be employed as appropriate. For example, the following method may be employed. Specifically, coprecipitates of cerium hydroxide and praseodymium hydroxide are generated by using a solution obtained by dissolving a cerium compound (for example, a nitrate, a sulfate, an acetate, or the like of cerium) and a praseodymium compound (for example, a nitrate, a sulfate, an acetate, or the like of praseodymium) in a solvent (for example, ion-exchanged water). The obtained coprecipitates are dried, and then calcined. Thus, the composite metal oxide of cerium oxide and praseodymium oxide is obtained. Note that a method for generating the coprecipitates in the solution is also not particularly limited. For example, a method in which the coprecipitates are generated by adding ammonia to the solution, a method in which the coprecipitates are generated by adding urea to the solution, and then decomposing the urea by heating, to thereby generate ammonia in the solution, or the like may be employed as appropriate. Moreover, if necessary, a surfactant or the like may be added to the solution. Moreover, the conditions for the calcination of the coprecipitates are not particularly limited, and, for example, conditions of heating at a temperature of 650° C. or below for 3 to 20 hours can be employed. In addition, when the composite metal oxide further comprises aluminum oxide in addition to cerium oxide and praseodymium oxide, the composite metal oxide may be produced by further adding an aluminum compound (for example, a nitrate, a sulfate, an acetate, or the like of aluminum) to the solution. When the solution further contains the aluminum compound as described above, coprecipitates of cerium hydroxide, praseodymium hydroxide, and aluminum hydroxide can be generated as the coprecipitates. By drying and then calcining the coprecipitates, a composite metal oxide of cerium oxide, praseodymium oxide, and aluminum oxide can be obtained.

In addition, another preferably employable method for producing the composite metal oxide of cerium oxide and praseodymium oxide is, for example, a method (I) comprising the steps of:

introducing independently a first raw material solution containing cerium ions and praseodymium ions (when a composite metal oxide comprising aluminum oxide is produced, aluminum ions are preferably further contained) and a second raw material solution containing a polymeric dispersant directly into a region in which a shear rate is 1000 to 200000 sec$^{-1}$, and homogeneously mixing the material solutions, thereby obtaining a colloid solution of metal compounds;

adjusting a pH of the colloid solution to a pH condition under which the colloid solution can maintain a state of being dispersed in the liquid;

optionally adding an organic amine to the colloid solution for performing a gelling treatment, thereby obtaining a suspension of the metal compounds; and degreasing the colloid solution whose pH is adjusted or the suspension of the metal compounds, and performing a heat treatment in an oxidizing atmosphere under a temperature condition of 500 to 1050° C. (preferably 650 to 1050° C.), thereby obtaining a composite metal oxide of cerium oxide and praseodymium oxide. By the method (I), ultrafine particles containing ceria and ultrafine particles containing praseodymium are uniformly mixed with each other at an extremely high degree of dispersion, and a composite metal oxide whose crystallite diameter (primary particle diameter) and specific surface area are controlled at the nano size level can be produced efficiently. In this manner, the method (I) makes it possible to obtain a composite metal oxide in a state where cerium oxide and praseodymium oxide are dispersed in each other at an extremely high level. In addition, when a composite metal oxide further comprising aluminum oxide is produced by using the method (I), the aluminum oxide in the obtained composite metal oxide acts as a diffusion barrier, and thus suppresses particle growth of cerium oxide, praseodymium oxide, or the composite oxide comprising cerium and praseodymium. Hence, it is possible to obtain a composite metal oxide satisfying the following conditions: after calcined in air at 1100° C. for 5 hours, a total pore volume of pores (mesopores) having pore diameters in a range from 1 nm to 0.1 µm measured by a nitrogen adsorption method is 0.18 cm$^3$/g or more; and a total pore volume of pores (macropores) having pore diameters in a range from 0.1 µm to 10 µm measured by a mercury intrusion method is 0.2 cm$^3$/g or more, or satisfying the following condition: after heated in an inert gas (for example, Ar gas or the like) atmosphere at 800° C. for 1 hour, the composite metal oxide has an average primary particle diameter of 15 nm or less. In addition, in the composite metal oxide obtained by using the method (I) as described above and further comprising aluminum oxide, the crystals of cerium oxide, praseodymium oxide, or the composite oxide comprising cerium and praseodymium can be made fine. Hence, a catalytic performance (the amount of hydrogen generated) of the obtained composite metal oxide tends to be further improved. Hereinafter, the steps in the method (I) are described separately.

[Step of Obtaining Colloid Solution]

The first raw material solution containing cerium ions and praseodymium ions (the first raw material solution may further contain aluminum ions and other metal ions, if necessary) can be obtained by dissolving a cerium compound and a praseodymium compound (and, if necessary, an aluminum compound and other metal compounds) in a solvent. Note that when a composite metal oxide comprising aluminum oxide is produced, an aluminum compound is dissolved in the solvent of the first raw material solution together with the cerium compound and the praseodymium compound.

As the cerium compound, the praseodymium compound, the aluminum compound, and the other metal compounds, salts (acetates, nitrates, chlorides, sulfates, sulfites, inorganic complex salts, and the like) of these metals are preferably used. In particular, acetates or nitrates are particularly preferable from the viewpoint that this makes it easier to obtain a composite metal oxide containing no residual chlorine, sulfur, or the like.

Examples of the solvent used for the first raw material solution include water, water-soluble organic solvents (methanol, ethanol, propanol, isopropanol, butanol, acetone, acetonitrile, and the like), mixture solvents of water with any of the water-soluble organic solvents, and the like.

In the first raw material solution, the ratio of cerium ions to praseodymium ions is preferably 95:5 to 5:95 (and more preferably 90:10 to 50:50) in terms of molar ratio per liter of the solution. If the content of the cerium ions is less than the lower limit, the amount of cerium involved in the water splitting tends to decrease. Meanwhile, if the content of the cerium ions exceeds the upper limit, the amount of ceria reduced into the trivalent state decreases, so that a hydrogen generation performance tends to be exhibited insufficiently.

Moreover, when an aluminum compound (aluminum ions originated from the compound) is added to the first raw material solution in addition to the cerium compound and the praseodymium compound (when a composite metal oxide further comprising aluminum oxide is produced), the content of the aluminum compound in the first raw material solution only needs to be adjusted depending on a desired composition of the composite metal oxide, and is not particularly limited. For example, when the content of aluminum oxide in the obtained composite metal oxide is set within the preferred range of the content of the aluminum oxide described for the above-described composite metal oxide of the present invention (preferably from 5 to 50% by mass, more preferably from 5 to 40% by mass, and further preferably from 5 to 35% by mass relative to the total amount of cerium oxide, praseodymium oxide, and aluminum oxide in the composite metal oxide), the content may be changed as appropriate depending on the species of the aluminum compound used, so that the condition can be satisfied. Note that the content of the aluminum compound is preferably 15 to 80% by mole (more preferably 15 to 70% by mole) relative to the total amount of cations of cerium, praseodymium, and aluminum in the first raw material solution. If the content of the aluminum compound is less than the lower limit, the effect achieved by adding the aluminum oxide (the effect of suppressing the thermal degradation (particle growth) of cerium oxide, praseodymium oxide, or the composite oxide comprising cerium and praseodymium) tends to be insufficient in the obtained composite metal oxide. Meanwhile, if the content of the aluminum compound exceeds the upper limit, the contents of cerium oxide and praseodymium oxide decrease in the obtained composite metal oxide, and hence the amount of hydrogen generated per weight of the composite metal oxide as a whole tends to decrease, instead.

Moreover, when metal ions other than the cerium ions, the praseodymium ions, and the aluminum ions are contained, (when the first raw material solution contains a metal compound other than the cerium compound, the praseodymium compound, and the aluminum compound), the content of the other metal ions is not particularly limited, and can be adjusted depending on a desired composition of the composite metal oxide. The content of the other metal ions is preferably 80% by mole or less (more preferably 70% by mole or less, and further preferably 65% by mole or less) relative to the total amount of cations in the first raw material solution.

Moreover, the cation concentration in the first raw material solution containing the metal ions is preferably 0.005 to 0.5 mol/L, and more preferably 0.01 to 0.3 mol/L. If the cation concentration is within the above-range, the crystallites of the metal compounds are dispersed in the liquid in their original state or in a state of uniform aggregates having smaller diameters, so that a colloid solution excellent in storage stability can be obtained. On the other hand, if the cation concentration is lower than the lower limit, the yield of crystallites of the metal compounds tends to be lowered. Meanwhile, if the cation concentration exceeds the upper limit, the distances between crystallites and/or aggregates (hereinafter, referred to as metal compound fine particles in some cases) of the metal compounds in the colloid solution become smaller than the size of association of the polymeric dispersant. Hence, the repulsive force due to steric hindrance by the adsorption of the polymeric dispersant does not act effectively, and the crystallites or the aggregates tend to further aggregate.

The second raw material solution containing a polymeric dispersant can be obtained by dissolving a polymeric dispersant, and, if necessary, an ammonium salt (ammonium acetate, ammonium nitrate, or the like), ammonia water, an acid (acetic acid, nitric acid, or the like), aqueous hydrogen peroxide, or the like in a solvent. As the polymeric dispersant, a polyalkyleneimine, polyacrylic acid, polyvinylpyrrolidone, or polyethylene glycol is preferable. A polyalkyleneimine or polyacrylic acid is more preferable from the viewpoint that a higher dispersibility can be exhibited in the liquid. A polyalkyleneimine is particularly preferable from the viewpoint that a colloid solution obtained under a predetermined pH condition has a particularly excellent storage stability.

A weight average molecular weight of the polyalkyleneimine is preferably 3000 to 15000, and more preferably 8000 to 12000. When the weight average molecular weight of the polyalkyleneimine is within the above-described range, the crystallites of the metal compounds are dispersed in their original state or in a state of uniform aggregates having smaller diameters, so that a colloid solution excellent in storage stability can be obtained. In contrast, if the weight average molecular weight of the polyalkyleneimine is less than the lower limit, the repulsive force due to steric hindrance is not developed sufficiently even when the polyalkyleneimine adsorbs onto the metal compound fine particles, and hence the metal compound fine particles tend to aggregate. Meanwhile, if the weight average molecular weight exceeds the upper limit, the polyalkyleneimine forms a cross-linking structure, and larger aggregates tend to be formed. Note that the above-described weight average molecular weight is a value measured by gel permeation chromatography (GPC) (apparatus name: molecular weight distribution measuring system (manufactured by Shimadzu Corporation), solvent: THF, column: GPC-80M, temperature: 40° C., rate: 1 ml/min), and converted in terms of a standard substance (manufactured by Showa Denko K. K. under the trade name of shodex STANDARD).

Moreover, when a polyalkyleneimine is used as the polymeric dispersant, the concentration of the polyalkyleneimine in the second raw material solution preferably adjusted so that the content of the polyalkyleneimine per unit surface area of the crystallites of the metal compounds can be 5 to 35 mg/m$^2$ (more preferably 5 to 15 mg/m$^2$) in the obtained colloid solution. When the content of the polyalkyleneimine in the colloid solution is within the above-described range, the crystallites of the metal compounds are dispersed in their original state or in a state of uniform aggregates having smaller diameters, so that a colloid solution excellent in storage stability can be obtained. Since the state in which the crystallites of the metal compounds are dispersed in their original state or the state of uniform aggregates having smaller diameters is retained sufficiently as described above, the average particle diameter of the finally obtained composite metal oxide of cerium oxide and praseodymium oxide can be made sufficiently fine, and a composite metal oxide having an average primary particle diameter of 1 to 15 nm can be produced efficiently. In contrast, when the content of the polyalkyleneimine is less than the lower limit, the surfaces of the metal compound fine particles cannot be coated with the polyalkyleneimine sufficiently, so that larger aggregates tend to be formed because of aggregation of the metal compound fine particles. Meanwhile, if the content of the polyalkyleneimine exceeds the upper limit, a large amount of the polyalkyleneimine in a free state is present in the colloid solution. For this reason, the cross-linking reaction of the polyalkyleneimine proceeds remarkably, so that aggregates having larger particle diameters tend to be formed.

Examples of the solvent used for the second raw material solution include water, water-soluble organic solvents (methanol, ethanol, propanol, isopropanol, butanol, acetone, acetonitrile, and the like), mixture solvents of water with any of the water-soluble organic solvents, and the like.

In addition, in the step of obtaining a colloid solution, the first raw material solution and the second raw material solution are introduced independently of each other directly into a region in which a shear rate is 1000 to 200000 sec$^{-1}$, and homogeneously mixed with each other. By the homogeneous mixing as described above, crystallites of the metal compounds can be dispersed in the liquid in their original state or in a state of uniform aggregates having smaller diameters even in a solvent such as water in which the crystallites of the metal compounds are prone to aggregate.

For example, an apparatus shown in FIG. 1 can be preferably used for the mixing method. Hereinafter, a method which can be preferably employed as the mixing method is described with reference to FIG. 1. Note that, in the following description and drawings, the same or equivalent components are denoted by the same reference numerals, and overlapping description will be omitted.

Figure 2:
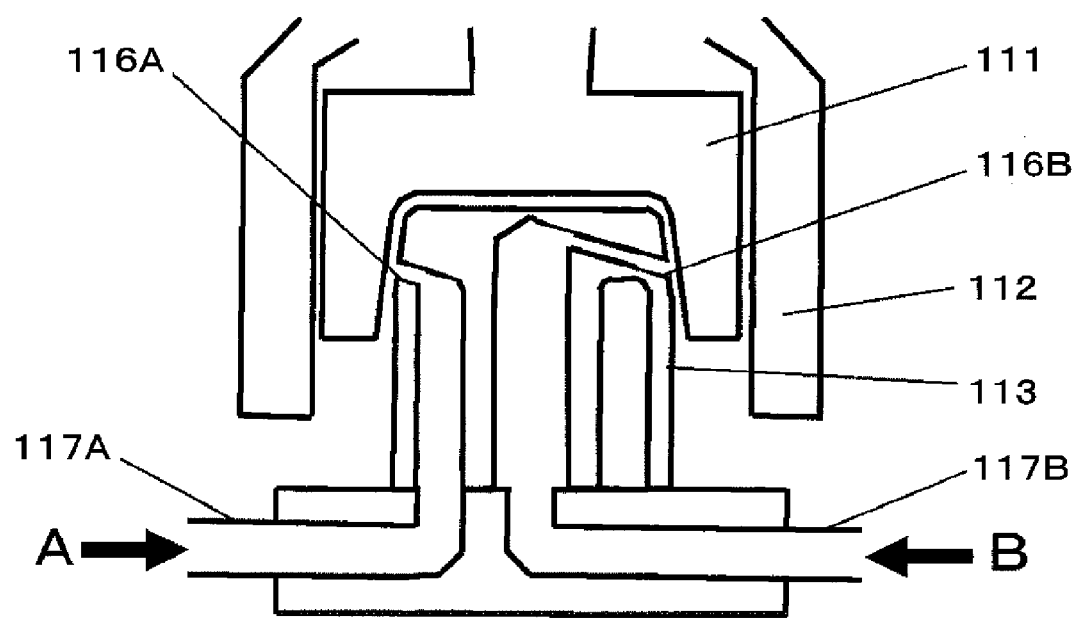
FIG. 2 is an enlarged vertical cross-sectional view showing an end portion (starring portion) of a homogenizer 110 shown in FIG. 1.

The production apparatus shown in FIG. 1 includes a homogenizer 110 as a stirrer. An end portion (a starring portion) of the homogenizer 110 is located in a reaction vessel 120. As shown in FIG. 2, the end portion of the homogenizer 110 includes a concave rotor 111, a concave outer stator 112, and a convex inner stator 113. The outer stator 112 is disposed in such a way that a region with a predetermined gap is formed between the outer stator 112 and an outer periphery of the rotor 111. The inner stator 113 is disposed in such a way that a region with a predetermined gap is formed between the inner stator 113 and an inner periphery of the rotor 111. In addition, the rotor 111 is connected to a motor 115 via a rotation shaft 114, so that a structure which allows rotation is formed.

In addition, in the production apparatus shown in FIG. 1, multiple nozzles, i.e., nozzles 116A for introducing a raw material solution A and nozzles 116B for introducing a raw material solution B are provided. Each of the nozzles 116A and nozzles 116B is provided on a surface, of the inner stator 113, facing to the rotor 111. In addition, an apparatus (not illustrated) for supplying the raw material solution A is connected to the nozzles 116A via a flow path 117A, and an apparatus (not illustrated) for supplying the raw material solution B is connected to the nozzles 116B via a flow path 117B. Thus, a structure is formed with which the raw material solution A and the raw material solution B can be introduced independently of each other directly into the region between the rotor 111 and the inner stator 113.

Figure 3:
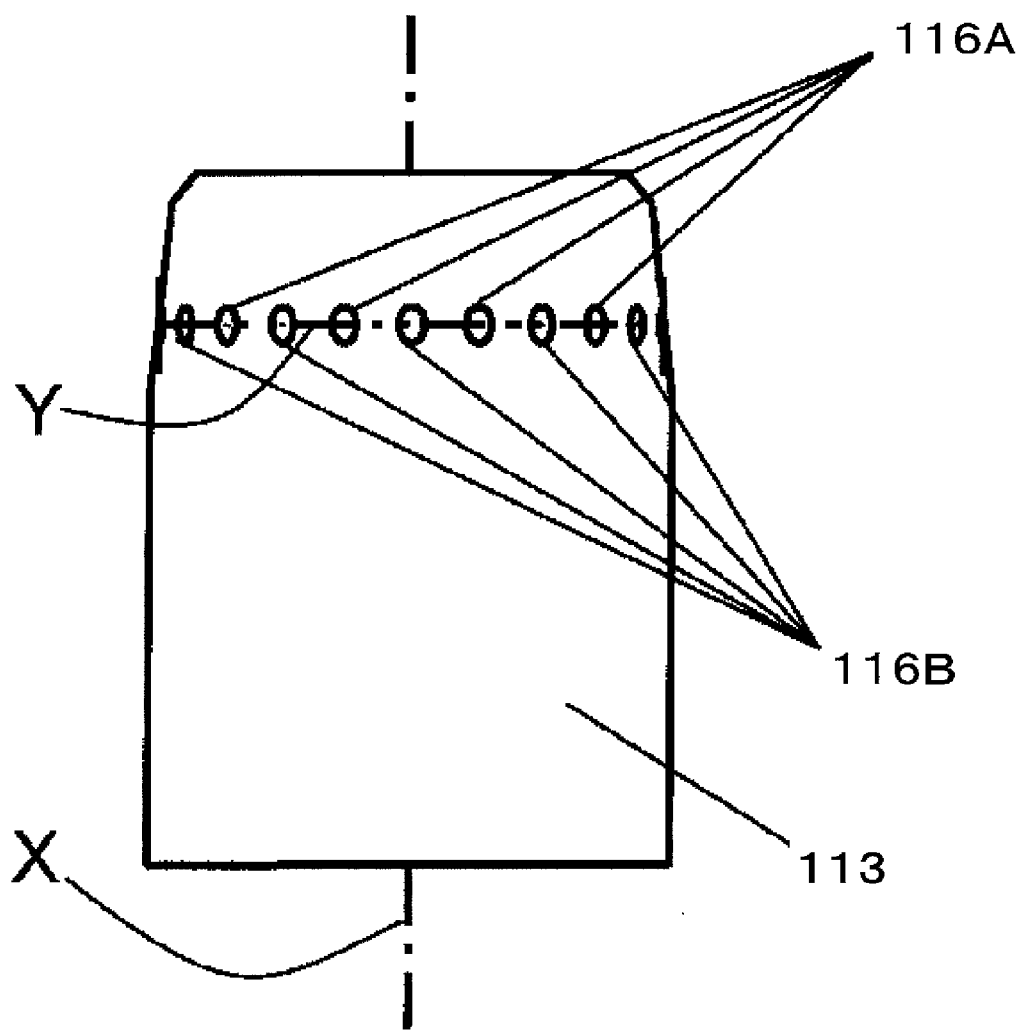
FIG. 3 is a side view of an inner stator 113 shown in FIG. 1.
Figure 4:
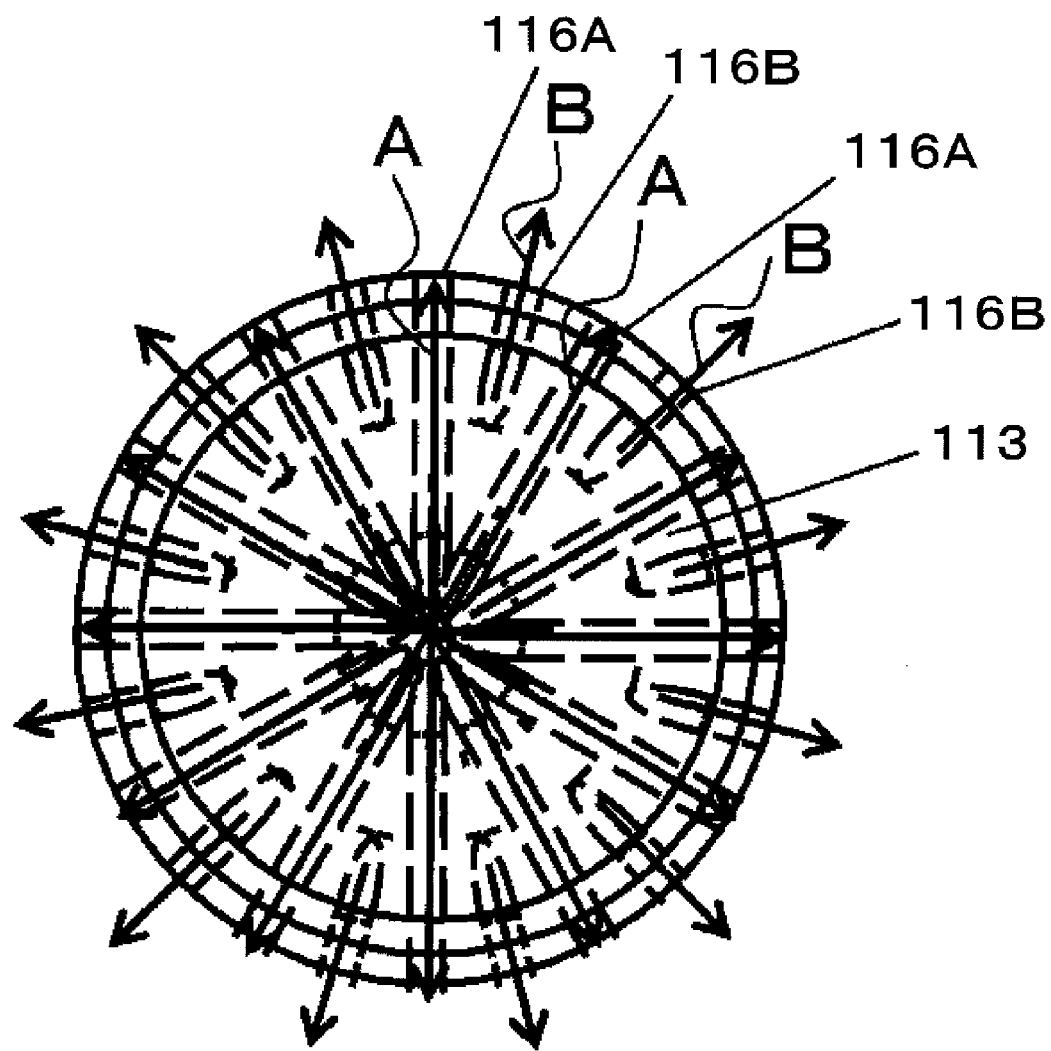
FIG. 4 is a horizontal cross-sectional view of the inner stator 113 shown in FIG. 1.

In addition, in the production apparatus shown in FIG. 1, the nozzles 116A and the nozzles 116B are alternately arranged on the surface, of the inner stator 113, facing to the rotor 111 in an outer circumferential direction on a predetermined plane Y perpendicular to an axis X of rotation of the rotor 111, as shown in FIGS. 3 and 4.

Note that, in FIGS. 3 and 4, the numbers of the nozzles 116A and the nozzles 116B provided are each 12 (24-hole-type). However, the numbers of the nozzles 116A and the nozzles 116B are not particularly limited. Accordingly, it is only necessary to provide one nozzle 116A and one nozzle 116B (two-hole-type). However, the numbers of the nozzles 116A and the nozzles 116B are each preferably 10 or more, and more preferably 20 or more, from the viewpoint that the time from the introduction of the raw material solution A and the raw material solution B into the region to the completion of the homogeneous mixing can be shortened. Meanwhile, an upper limit of each of the numbers of the nozzles 116A and the nozzles 116B is not particularly limited, and varies depending on the size of the apparatus. However, from the viewpoint that clogging of the nozzles is more surely prevented, the upper limits are preferably set such that the diameter of an opening portion of each of the nozzles 116A and the nozzles 116B alternately arranged can have a dimension of approximately 0.1 mm or more. The diameter of the opening portion of each nozzle is not particularly limited as described above, and varies depending on the size of the apparatus. However, the diameter is preferably approximately 0.1 to 1 mm, from the viewpoint that clogging of the nozzles is more surely prevented.

In addition, in FIGS. 3 and 4, the nozzles 116A and the nozzles 116B are alternately arranged in a single row in the outer circumferential direction on the single plane Y perpendicular to the axis X of rotation of the rotor 111, but may be alternately provided in multiple rows in the outer circumferential direction on multiple planes.

In the production apparatus shown in FIG. 1 described above, the shear rate is set to 1000 to 200000 sec$^{-1}$, and more preferably set to 2000 to 100000 sec$^{-1}$, in the region into which the raw material solution A and the raw material solution B are introduced through the nozzles 116A and the nozzles 116B, respectively, i.e., the region between the inner periphery of the rotor 111 and the outer periphery of the inner stator 113 in FIGS. 1 and 2. If the shear rate in this region is less than the lower limit, the aggregation of crystallites of the metal compounds and the structure in which the polymeric dispersant adsorbs onto multiple crystallites are not destructed. As a result, larger aggregates remain. Meanwhile, if the shear rate in this region exceeds the upper limit, the polymeric dispersant is destructed, and hence a stable colloid solution cannot be obtained.

Note that when a polyalkyleneimine is used as the polymeric dispersant, the shear rate is preferably set to 20000 $sec^{-1}$ or less in the region into which each of the raw material solution A and the raw material solution B is introduced, respectively. If the shear rate in the region exceeds the upper limit, the polyalkyleneimine is destructed, and a sufficient repulsive force cannot be applied to the metal compound fine particles. As a result, larger aggregates tend to be formed.

There is a requirement for achieving such a shear rate. Specifically, since a rotation speed of the rotor and the size of the gap between the rotor and the stator have influences on the shear rate, the rotation speed and the size of the gap need to be set so that the shear rate in the region can satisfy the above-described condition. A specific rotation speed of the rotor 111 is not particularly limited, and varies depending on the size of the apparatus. However, for example, in a case where the outer diameter of the inner stator 113 is 12.0 mm, the gap between the rotor 111 and the outer stator 112 is 0.2 mm, the gap between the rotor 111 and the inner stator 113 is 0.5 mm, the inner diameter of the outer stator 112 is 18.8 mm, the outer diameter of the rotor 111 is 18.4 mm, and the inner diameter of the rotor 111 is 13.0 mm, the above-described shear rate can be achieved by setting the rotation speed of the rotor 111 to preferably 2000 to 20000 rpm, and more preferably 3000 to 15000. Note that when the gap between the inner stator 113 and the rotor 111 is 0.2 mm, the above-described shear rate can be achieved by setting the rotation speed of the rotor 111 to preferably 839 to 8387 rpm, and more preferably 1258 to 6291 rpm.

In addition, the size of the gap between the rotor 111 and the inner stator 113 is also not particularly limited, and varies depending on the size of the apparatus. However, the size is preferably 0.2 to 1.0 mm, and more preferably 0.5 to 1.0 mm. Moreover, the size of the gap between the rotor 111 and the outer stator 112 is also not particularly limited, and varies depending on the size of the apparatus. However, the size is preferably 0.2 to 1.0 mm, and more preferably 0.5 to 1.0 mm. The shear rate in the above-described range can be achieved by adjusting the rotation speed of the rotor 111 correspondingly to the change in the sizes of the gaps. If any of these gaps is smaller than the lower limit, clogging of the gap tends to occur easily. Meanwhile, if any of these gaps is larger than the upper limit, there is a tendency that an effective shearing force cannot be applied.

In addition, in the production apparatus shown in FIG. 1, the nozzles 116A and the nozzles 116B are preferably arranged such that the raw material solution A and the raw material solution B supplied through the nozzles 116A and the nozzles 116B, respectively, can be homogeneously mixed with each other within 1 msec (particularly preferably within 0.5 msec) after the introduction into the region. Note that the time from the introduction of the raw material solutions into the region to the completion of the homogeneous mixing herein refers to a time taken for the raw material solution A (or the raw material solution B) introduced thorough each nozzle 116A (or each nozzle 116B) to reach a position of an adjacent nozzle 116B (or an adjacent nozzle 116A), and mixed with the raw material solution B (or the raw material solution A) introduced through a corresponding one of the nozzles 116B (or the nozzles 116A).

Hereinabove, the apparatus preferably used for the above-described method (I) is described. However, in the method (I), the first raw material solution may be used as the raw material solution A, and the second raw material solution may be used as the raw material solution B. Alternatively, the second raw material solution may be used as the raw material solution A, and the first raw material solution may be used as the raw material solution B. In addition, the method (I) is not limited to one using the production apparatus shown in FIG. 1. For example, each of the nozzles 116A and the nozzles 116B is provided on the surface, of the inner stator 113, facing to the rotor 111 in the production apparatus shown in FIG. 1. However, each of the nozzles 116A and the nozzles 116B may be provided on a surface, of the outer stator 112, facing to the rotor 111. With such a configuration, the raw material solution A and the raw material solution B can be introduced independently of each other directly into the region between the rotor 111 and the outer stator 112. Note that the shear rate in the region needs to be set so that the above-described condition can be satisfied.

A flow rate of each of the first raw material solution and the second raw material solution is not particularly limited, and is preferably 1.0 to 30 ml/min. If the flow rate of the raw material solution is less than the lower limit, an efficiency of the production of the crystallites of the metal compounds and the aggregates thereof tends to be lowered. Meanwhile, if the flow rate exceeds the upper limit, the particle diameters of the aggregates of the crystallites of the metal compounds tend to increase.

[Step of Adjusting pH of Colloid Solution]

In the method (I), the pH of the colloid solution is adjusted to a pH condition under which the colloid solution can maintain a state of being dispersed in the liquid. Note that the state where the colloid solution can maintain the state of being dispersed in the liquid herein refers to a state where aggregation of nano particles or aggregates thereof does substantially not proceed in the colloid solution.

The pH condition is set as appropriate depending on the polymeric dispersant used and the like, and cannot be generally discussed. For example, when a polyalkyleneimine is used as the polymeric dispersant, the pH condition is preferably 1.0 to 6.0. In addition, when a polyalkyleneimine is used as the polymeric dispersant, and the first raw material solution contains aluminum ions, the pH of the colloid solution is particularly preferably adjusted to 3.0 to 5.0. If the pH of the colloid solution is within the above-described range, the polyalkyleneimine dissociates to form $NH_3^+$ groups, which adsorb onto negatively charged sites or neutral sites of the crystallites of the metal compounds, and exhibits a dispersing effect. As a result, the crystallites of the metal compounds are dispersed in their original state or in a state of uniform aggregates having smaller diameters, so that a colloid solution excellent in storage stability can be obtained.

In addition, if the pH of the colloid solution exceeds the upper limit, the degree of dissociation of the polyalkyleneimine is so small that the polyalkyleneimine does not easily adsorb onto the crystallites of the metal compounds. As a result, the amount of the polyalkyleneimine adsorbed onto the crystallites of the metal compounds decreases, and a sufficient repulsive force is not developed between the crystallites of the metal compounds. Consequently, the crystallites of the metal compounds tend to aggregate. Meanwhile, if the pH of the colloid solution is lower than the lower limit, the surfaces of the crystallites of the metal compounds are positively charged to a large extent. Hence, the polyalkyleneimine in which $NH_3^+$ groups are formed because of the dissociation does not easily adsorb onto the crystallites of the metal compounds, and a sufficient repulsive force is not developed between the metal compound fine particles. As a result, the metal compound fine particles tend to aggregate. Meanwhile, if the pH of the colloid solution is lower than 1, nucleation of particles of cerium oxide (or cerium hydroxide) tends to be insufficient. In addition, if the pH of the colloid solution is 1 or higher and lower than 3 in a case where the first raw material solution contains aluminum ions, nucleation of particles of aluminum oxide (or aluminum hydroxide) tends to be insufficient because the pH does not reach the point of neutralization of aluminum. Note that a composite metal oxide obtained by performing a heat treatment described later on a colloid solution whose pH is 1 or higher and lower than 3, and which contains particles of alumina (or aluminum hydroxide) tends to have an insufficient heat resistance of alumina and a low degree of fine dispersion of aluminum oxide, cerium oxide, and praseodymium oxide in each other.

Note that the step of adjusting the pH of the colloid solution may be performed simultaneously with the step of obtaining the colloid solution by adjusting, as appropriate, the kinds, the concentrations, and the like of components contained in the first raw material solution and the second raw material solution used in the step of obtaining the colloid solution. For example, the pH adjustment may be separately conducted by adding an acid to the colloid solution obtained after the step of obtaining a colloid solution is performed. Alternatively, the pH adjustment may be conducted by adding an acid to at least one of the first and second raw material solutions in advance so that the pH of the colloid solution obtained in the step of obtaining a colloid solution can be within a specific range (for example, 3 to 5).

[Gelling Treatment Step]

In addition, in the method (I), a gelling treatment may be optionally conducted by adding an organic amine to the colloid solution after the pH adjustment, to thereby adjust again the pH to 6 to 9.5. By this treatment, the polymeric dispersant in the colloid solution are desorbed from the aggregates of the crystallites of the metal compounds, and the aggregates of the crystallites of the metal compounds aggregate instantly. However, since the organic amine plays a similar role to that of the polymeric dispersant, excessive aggregation is suppressed. As a result, a suspension containing aggregates of the crystallites of the metal compounds having moderate sizes can be obtained. Here, the temperature and the time are not particularly limited, and, for example, it is preferable to fix the uniform dispersion state by stirring at a temperature of 10 to 40° C. for about 5 to 60 seconds. In addition, the organic amine is preferably ethylenediamine, triethanolamine, or the like.

[Heat Treatment Step]

Subsequently, in the method (I), the colloid solution after the pH adjustment or the suspension of the metal compounds obtained in the gelling treatment step is subjected to a degreasing treatment and a heat treatment. Thus, the composite metal oxide is obtained.

In this step, degreasing conditions are not particularly limited, and it is preferable to perform the degreasing by heating in an oxidizing atmosphere (for example, in the air) under conditions of 200 to 400° C. and 1 to 5 hours (more preferably 2 to 5 hours). By performing the degreasing treatment, the polymeric dispersant is removed, and the macropores are formed. Note that when the degreasing treatment is performed, the colloid solution or the suspension may be subjected to a drying step in advance in which the colloid solution or the suspension is dried under conditions of 80 to 100° C. and 1 to 10 hours.

Conditions of the heat treatment conducted after the degreasing treatment are preferably an oxidizing atmosphere (for example, in the air) and a temperature of 500 to 1050° C. If the temperature is lower than the lower limit, the sintering is not completed. Hence, when the catalyst is used, the sintering proceeds, so that the catalytic performance tends to remarkably deteriorate. Meanwhile, if the temperature exceeds the upper limit, the specific surface area decreases, the average crystallite diameter of the particles of the composite metal oxide increases, the central pore diameter increases, and the pore volume decreases. As a result, the catalytic performance tends to deteriorate. In addition, the heat treatment temperature is particularly preferably 650 to 1050° C., from the viewpoint that a better catalytic performance tends to be obtained.

Moreover, the heat treatment time is not particularly limited, and it is preferable to keep the temperature for about 1 to 10 hours. If the time is less than the lower limit, the conversion of the metal compounds constituting the aggregates to the metal oxides tends to be insufficient. Meanwhile, if the time exceeds the upper limit, performance deterioration such as sintering tends to occur because of the high-temperature oxidizing atmosphere.

Thus, a composite metal oxide can be obtained which comprises a mixture of first ultrafine particles containing cerium oxide and second ultrafine particles containing praseodymium oxide (and further comprising third ultrafine particles containing aluminum oxide in some cases). In addition, in the thus obtained composite metal oxide comprising the mixture, the cerium oxide and the praseodymium oxide are present in a state where ultrafine particles of the cerium oxide and the praseodymium oxide are highly dispersed in each other. Hence, a higher level of hydrogen generation performance tends to be obtained. Moreover, when a solid solution of cerium oxide and praseodymium oxide is formed in at least part of the thus obtained composite metal oxide comprising the mixture, a higher level of interaction is obtained. Thus, a higher level of hydrogen generation performance tends to be obtained. Furthermore, when the composite metal oxide comprising the mixture contains third ultrafine particles made of aluminum oxide, the aluminum oxide can suppress the particle growth of the crystals of the cerium oxide, the praseodymium oxide, or the composite oxide comprising cerium and praseodymium. Hence, a further advanced level of hydrogen generation performance tends to be obtained.

In addition, the hydrogen production catalyst of the present invention comprising the composite metal oxide of cerium oxide and praseodymium oxide may further comprise a component (for example, a known hydrogen production catalysts comprising another metal oxide, or the like) other than the composite metal oxide, unless the effect is adversely affected.

In addition, the form of the hydrogen production catalyst of the present invention is not particularly limited, and, for example, the catalyst may be used in the form of a monolithic catalyst having a honeycomb shape in which the catalyst is supported on a catalyst substrate, a pellet catalyst having a pellet shape, or the like. The catalyst substrate used here is also not particularly limited, and a particulate filter substrate (a DPF substrate), a monolithic substrate, a pellet-shaped substrate, a plate-shaped substrate, or the like can preferably be employed. In addition, a material of the catalyst substrate is also not particularly limited, and a substrate made of a ceramic such as cordierite, silicon carbide, or mullite, or a substrate made of a metal such as stainless steel containing chromium and aluminum can preferably be employed. Moreover, a method for supporting the composite metal oxide on such a catalyst substrate is not particularly limited, and a known method can be employed as appropriate.

In addition, when the hydrogen production catalyst of the present invention has a pellet shape, the average particle diameter of the pellets is not particularly limited, and is preferably 0.05 mm to 100 mm, and further preferably 0.1 mm to 50 mm. If the average particle diameter of the pellets is less than the lower limit, the pellets act as a resistance against the supply of the inert gas or water, leading to a large pressure loss. Hence, excessive energy is required in a case where any one of the step of thermally reducing the catalyst and the step of generating hydrogen by using the reduced catalyst is performed, so that each of the steps is difficult to perform efficiently. Meanwhile, if the average particle diameter of the pellets exceeds the upper limit, the reaction of the composite metal oxide with steam cannot be caused to proceed efficiently in the step of generating hydrogen by using the reduced catalyst, so that hydrogen production performance tends to deteriorate.

Hereinabove, the hydrogen production catalyst of the present invention is described. Next, a method for producing hydrogen of the present invention is described.

The method for producing hydrogen of the present invention is a method in which the above-described hydrogen production catalyst of the present invention is used, the method comprising:

a step (A) of thermally reducing the hydrogen production catalyst; and a step (B) of splitting water by bringing water into contact with the hydrogen production catalyst reduced in the step (A), to thereby generate hydrogen and oxidize the hydrogen production catalyst.

As described above, the method for producing hydrogen of the present invention is a method in which the above-described hydrogen production catalyst of the present invention is used, the method comprising: thermally reducing the catalyst; and then splitting water by bringing water into contact with the reduced catalyst, to thereby produce hydrogen. Hereinafter, the step (A) and the step (B) are described separately.

First, the step (A) is described. The step (A) is a step of thermally reducing the hydrogen production catalyst. A temperature condition employed in the step (A) only needs to be a temperature at which the hydrogen production catalyst can be reduced. A known temperature condition employed in a conventional method for producing hydrogen using a known catalyst containing ceria can be employed as appropriate. Preferably, the step (A) is a step of thermally reducing the hydrogen production catalyst under a temperature condition of 400 to 900° C. (more preferably 500 to 850° C. and further preferably 600 to 850° C.), because the hydrogen production catalyst of the present invention can be reduced efficiently even at low temperatures of 900° C. or below. If the temperature for the thermal reduction is lower than the lower limit, the rate at which the reduction of the catalyst proceeds is lowered, so that it tends to be difficult to perform a sufficiently efficient reduction step. Meanwhile, if the temperature exceeds the upper limit, the crystal particles of the composite metal oxide in the hydrogen production catalyst undergo particle growth, so that the activity of the hydrogen production catalyst may be lowered. In addition, the practicability tends to be lowered, because it is necessary to use a special material for the reaction vessel because of the reduction at such a temperature. In the present invention, the hydrogen production catalyst can be reduced even at low temperatures of 900° C. or below as described above. Hence, the amount of a heat insulator or a lagging material used for the reaction vessel can be sufficiently reduced, and hydrogen can be produced at lower costs.

In addition, in the step (A), the hydrogen production catalyst is preferably thermally reduced in an inert gas atmosphere under the temperature condition. Examples of the inert gas include gases such as nitrogen, helium, neon, krypton, and argon. In addition, the inert gas may contain less than 0.1% of oxygen as an impurity (the purity of the inert gas is preferably 99.9% or higher). Moreover, in the step (A), a pressure condition for thermally reducing the hydrogen production catalyst is not particularly limited, and is preferably 0.01 to 0.2 MPa. If the pressure is lower than the lower limit, additional costs tend to be required for increasing the strength of the reactor. Meanwhile, if the pressure exceeds the upper limit, additional costs tends to be required for increasing the strength of the reactor, and in addition the release of oxygen from the catalyst tends to be suppressed.

Moreover, a time for which the step (A) is performed is not particularly limited, and may be set as appropriate in consideration of the temperature during the reduction, the amount of the catalyst used, and the like, so that the hydrogen production catalyst can be reduced sufficiently. When the step (A) is a step of thermally reducing the hydrogen production catalyst in an inert gas atmosphere under a temperature condition of 400 to 900° C. (more preferably 500 to 850° C. and further preferably 600 to 850° C.), the time for which the step (A) is performed is preferably 0.1 to 10 hours (more preferably 0.2 to 5 hours). If the time for which the step (A) is performed is less than the lower limit, it tends to be difficult to sufficiently reduce the catalyst. Meanwhile, if the time exceeds the upper limit, the excessively long reduction time tends to cause deterioration in economic efficiency, because the reduction of cerium from the tetravalent state to the trivalent state does not proceed more than a certain amount.

Next, the step (B) is described. The step (B) is a step of splitting water by bringing water into contact with the hydrogen production catalyst reduced in the step (A), to thereby generate hydrogen and oxidize the hydrogen production catalyst.

As described above, in the step (B), the hydrogen production catalyst reduced in the step (A) is used, and water is split by bringing water into contact with the reduced hydrogen production catalyst. By splitting water as described above, the hydrogen production catalyst is oxidized with oxygen in water molecules, so that hydrogen is generated. In other words, in the step (B), oxygen in water molecules is absorbed into oxygen-atom voids, which are formed by the release of oxygen atoms in the step (A), in the crystal structure of the composite metal oxide. Thereby, the bonds between oxygen and the metal elements are formed, and the crystal structure of the composite metal oxide is reconstructed (the composite metal oxide is oxidized). In addition, hydrogen atoms constituting the water molecules are released, so that hydrogen is generated.

In addition, a method for bringing water into contact with the hydrogen production catalyst as described above is not particularly limited, and a method employed in a known method for splitting water by bringing water into contact with a reduced catalyst can be employed as appropriate. For example, the method of bringing water into contact with the hydrogen production catalyst can be preferably utilized by bringing a gas containing water (for example, steam) into contact with the hydrogen production catalyst. Note that the gas containing water (for example, steam) may be a gas consisting of only steam, or a gas containing, as a gas component other than water, the same component as that in the atmosphere gas for performing the step (A). Note that when a gas component other than water is contained as described above, an inert gas (for example, a gas such as nitrogen or argon) is preferably used as the gas component other than water. As described above, water (for example, steam) is preferably brought into contact with the hydrogen production catalyst in an inert gas atmosphere in the step (B). Note that, as mentioned above, it is also possible to bring only steam into contact with the hydrogen production catalyst without using the inert gas.

In addition, in the step (B), a temperature condition (a reaction temperature condition) for splitting water by bringing water into contact with the hydrogen production catalyst is not particularly limited, as long as water can be split by the hydrogen production catalyst at the temperature. For example, a known temperature condition employed in a conventional method for producing hydrogen using a known catalyst containing ceria can be employed as appropriate. Preferably, the step (B) is a step of oxidizing the hydrogen production catalyst under a temperature condition of 50 to 600° C. (more preferably 65 to 550° C. and further preferably 65 to 500° C.), from the viewpoint that hydrogen is produced efficiently under a lower temperature condition. If the temperature condition is lower than the lower limit, the rate of the reaction for generating hydrogen tends to decrease. Meanwhile, if the temperature condition exceeds the upper limit, the condition tends to be disadvantageous for the generation of hydrogen in terms of the equilibrium of thermodynamics. In addition, a pressure condition for performing the step (B) is not particularly limited, and is preferably 0.01 to 0.2 MPa. If the pressure is lower than the lower limit, additional costs tend to be required for increasing the strength of the reactor. Meanwhile, if the pressure exceeds the upper limit, additional costs tend to be required for increasing the strength of the reactor.

In addition, the time for which the step (B) is performed is not particularly limited, and may be set as appropriate to a time which enables water to be sufficiently split by bringing the water into contact with the hydrogen production catalyst in consideration of the reaction temperature, the amount of the catalyst used, and the like. When water is split by bringing water into contact with the hydrogen production catalyst in an inert gas atmosphere under a temperature condition of 30 to 600° C. (more preferably 65 to 500° C.) in the step (B), the time for which the step (B) is performed is preferably 0.1 to 10 hours (more preferably 0.2 to 5 hours). If the time is less than the lower limit, it becomes difficult to sufficiently split water, so that it tends to be difficult to produce hydrogen efficiently. Meanwhile, if the time exceeds the upper limit, the hydrogen generation rate tends to decrease, because the amount of hydrogen which can be generated with a given amount of thermal reduction is constant.

In addition, the method for producing hydrogen of the present invention comprising the step (A) and the step (B) is a method in which the hydrogen production catalyst is reduced in the step (A), and the reduced hydrogen production catalyst is oxidized in the step (B), to thereby produce hydrogen by a thermochemical water splitting. Hence, hydrogen can be produced continuously by sequentially repeating the step (A) and the step (B) (hydrogen can be produced by a so-called two-step thermal water-splitting cycle). For this reason, it is preferable to repeatedly perform the step (A) and the step (B) from the viewpoint of producing hydrogen continuously and more efficiently.

Hereinabove, the method for producing hydrogen of the present invention is described. Next, description is given of a hydrogen production apparatus of the present invention which can be preferably used for performing the method for producing hydrogen of the present invention.

The hydrogen production apparatus of the present invention comprises:

the above-described hydrogen production catalyst of the present invention;

a reaction vessel in which the hydrogen production catalyst is placed;

water supply means connected to the reaction vessel for supplying water into the reaction vessel;

inert gas supply means connected to the reaction vessel for supplying an inert gas into the reaction vessel;

an exhaust pipe connected to the reaction vessel for discharging gas in the reaction vessel; and heating means for heating the inside of the reaction vessel, wherein the hydrogen production apparatus is configured to produce hydrogen by performing, in the reaction vessel, a step (A) of thermally reducing the hydrogen production catalyst and a step (B) of splitting water by bringing water into contact with the hydrogen production catalyst reduced in the step (A), to thereby generate hydrogen and oxidize the hydrogen production catalyst.

Hereinafter, a preferred embodiment of the present invention will be described in detail with reference to the drawings. Note that, in the following description and drawings, the same or equivalent components are denoted by the same reference numerals, and overlapping description thereof is omitted.

Figure 5:
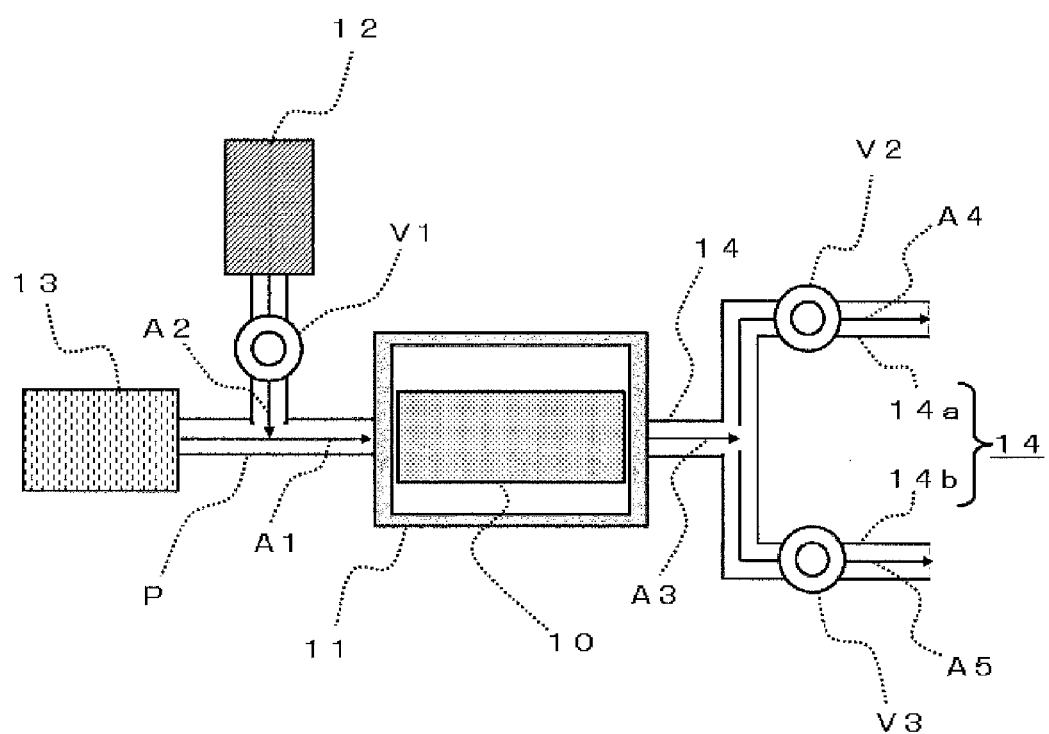
FIG. 5 is a schematic diagram showing a preferred embodiment of a hydrogen production apparatus of the present invention.

FIG. 5 is a schematic diagram of a preferred embodiment of the hydrogen production apparatus of the present invention. The hydrogen production apparatus shown in FIG. 5 basically comprises: a hydrogen production catalyst 10; a reaction vessel 11 in which the hydrogen production catalyst 10 is placed; water supply means 12 and inert gas supply means 13 which are connected to the reaction vessel 11; and an exhaust pipe 14 connected to the reaction vessel 11, and also comprises unillustrated heating means. Note that each of the arrows A1 to A5 in FIG. 5 schematically shows a direction in which steam or gas flows. In addition, the reference sign P denotes piping, and each of the reference signs V1 to V3 denotes a valve.

The hydrogen production catalyst 10 is the same as that described for the hydrogen production catalyst of the present invention.

The reaction vessel 11 is not particularly limited, as long as the reaction vessel 11 is a vessel which has a space in which the hydrogen production catalyst 10 can be placed, and in which two thermochemical steps (the step (A) and the step (B)) of reducing and oxidizing the hydrogen production catalyst can be performed. A known reaction vessel (for example, a reaction vessel in which a stainless steel such as SUS316L, a nickel alloy steel, a nickel steel, or the like is used as a base material of the main body of the reaction vessel, or the like) can be used as appropriate. In addition, the shape of the reaction vessel 11 is not particularly limited, and the design of the reaction vessel 11 can be changed as appropriate, if necessary. Moreover, if necessary, a heat insulator or a lagging material may be used, as appropriate, in the reaction vessel 11. Note that, in the present invention, the hydrogen production catalyst 10 placed in the reaction vessel 11 is the above-described hydrogen production catalyst of the present invention, and hence the step (A) and the step (B) can be performed at low temperatures of 900° C. or below, as mentioned above. Therefore, when a heat insulator or a lagging material is used for the reaction vessel, the amount of the heat insulator or the lagging material used can be reduced, and the production costs of the reaction vessel 11 can be also reduced.

The structure of the water supply means 12 is not particularly limited, as long as the water supply means 12 is connected to the reaction vessel 11 and is capable of supplying water into the reaction vessel 11. In addition, the water supply means 12 preferably has a structure capable of supplying water in the form of steam into the reaction vessel, from the viewpoint of causing the reaction to proceed efficiently. For example, a known steam production apparatus comprising a water tank and a heating device for vaporizing water can be used as appropriate. Note that, in the embodiment shown in FIG. 5, the water supply means 12 is connected to the reaction vessel 11 via the piping P, and the supply of water (steam) from the water supply means 12 can be controlled by opening or closing the valve V1 formed in the piping P.

The structure of the inert gas supply means 13 is not particularly limited, as long as the inert gas supply means 13 is connected to the reaction vessel 11, and is capable of supplying an inert gas such as $N_2$ or Ar into the reaction vessel 11. For example, a known apparatus for supplying an inert gas comprising a high-pressure tank filled with the inert gas, a gas pump, and the like can be used as appropriate. Note that, in the embodiment shown in FIG. 5, the inert gas supply means 13 is connected to the reaction vessel 11 via the piping P.

The exhaust pipe 14 is connected to the reaction vessel 11 for discharging gas in the reaction vessel 11. Note that the exhaust pipe 14 shown in FIG. 5 is formed of a pipe having branches, and branch pipes 14a and 14b are provided with the valves V2 and V3, respectively. The use of such valves V2 and 3 makes it possible to select, as appropriate, the kind of the pipe used depending on the step performed, the kind of the gas discharged, and the like. For example, when a gas containing hydrogen generated in the step (B) in the reaction vessel is discharged to the outside, the gas can be caused to flow in the direction A4 by using the pipe 14a. In other cases, the gas can be caused to flow in the direction A5 by using the pipe 14b. By opening or closing the valves for each step performed as described above, the gas can be caused to flow through a different gas flow path by using one of the pipes 14a and 14b depending on the kind of the gas, and hydrogen can be efficiently collected. Note that, for collecting the hydrogen, a hydrogen purification apparatus may be connected to the exhaust pipe 14. For example, a hydrogen purification apparatus using a hydrogen permeation membrane or the like can be used as the hydrogen purification apparatus.

In addition, the hydrogen production apparatus further comprises the unillustrated heating means for heating the inside of the reaction vessel 11. The heating means is used to heat the inside of the reaction vessel (and the catalyst 10 placed therein) to temperatures preferable for performing the steps (A) and (B). Known heating means can be used as appropriate, as long as the heating means has a structure capable of heating the inside of the vessel to such temperatures (reaction temperatures).

As the heating means, for example, heating means for heating the inside of the reaction vessel by utilizing a known heater or heat of sunlight or the like can be used as appropriate. In addition, a method for heating by such heating means may be one in which the heating means (for example, a heater or the like) is directly placed inside the reaction vessel 11 to thereby directly heat the inside of the reaction vessel 11, or one in which the heating means is provided outside the reaction vessel 11 (for example, in the piping P, the inert gas supply means 13, or the like), and consequently the inside of the reaction vessel 11 is heated. Examples of the method for heating by the heating means include a method in which the inert gas supply means 13 having a structure further comprising the heating means is employed, and the supplied inert gas is subjected to heating to a temperature preferable for performing the step (A) or (B) or the like depending on the step to be conducted, as appropriate, and the inside of the reaction vessel is heated by causing the inert gas at the appropriate temperature to flow into the reaction vessel 11; a method in which the heating means is provided in the vessel 11, the inside of the reaction vessel is directly heated by the heating means, and the inside of the reaction vessel is heated to a preferable temperature for performing the step (A) or (B) depending on the step to be conducted; and the like. As described above, the heating means may be placed inside the reaction vessel 11 or at a portion outside the reaction vessel 11, as long as the heating means is capable of heating the inside of the reaction vessel.

In addition, the heating means is preferably heating means capable of heating the inside of the reaction vessel 11 by utilizing heat of sunlight, from the viewpoint that a sustainable natural energy (sunlight) is used, and the energy can be converted into hydrogen, which is a storable chemical energy. Note that when such heating means for heating the inside of the reaction vessel 11 by utilizing heat of sunlight is used, the reaction vessel 11 may be provided, as appropriate, with a light transmission window or the like for transmission of (non-condensed or condensed) light, which allows incidence of the light into the reaction vessel.

In addition, the structure of the heating means for heating the inside of the reaction vessel by utilizing heat of sunlight is not particularly limited, and, for example, it is possible to employ light condensing means capable of raising the temperature inside the reaction vessel by condensation of sunlight and irradiation therewith (for example, an apparatus having a structure in which multiple optical elements such as mirrors or lenses are used, or the like). The light condensing means is not particularly limited, as long as the light condensing means has a structure capable of raising, as appropriate, the temperature inside the reaction vessel to a temperature necessary for performing each of the steps (A) and (B) depending on the step to be conducted by condensation of light. The design of the light condensing means can be changed as appropriate. In addition, when the light condensing means is used as the heating means, the light condensing means may be placed outside the reaction vessel 11 or inside the reaction vessel 11. For example, when the light condensing means is placed outside the reaction vessel 11, the reaction vessel 11 provided with a window may be used, and the inside of the reaction vessel 11 may be heated by irradiating, through the window, the inside with light condensed by the light condensing means formed of multiple mirrors or lenses. Alternatively, the inert gas and the like caused to flow into the reaction vessel 11 may be heated with solar heat obtained by condensing light by light condensing means formed of multiple mirrors or lenses, and consequently the inside of the reaction vessel 11 may be heated. Meanwhile, when the light condensing means is placed inside the reaction vessel 11, the reaction vessel 11 provided with a window can be used, and the inside of the reaction vessel 11 can be heated by condensing light incident through the window by light condensing means (heating means constituted of lenses and pr like) placed inside the reaction vessel 11.

Moreover, a so-called solar furnace (a furnace (apparatus) for heating by condensing sunlight) may be formed by the reaction vessel 11 and heating means utilizing heat of sunlight. In this case, a known solar furnace utilizing solar heat can be used, as appropriate, as the reaction vessel 11 and the heating means.

In addition, the piping P for connecting the water supply means 12 and the like to the reaction vessel 11 is not particularly limited, and a known piping can be used as appropriate. Moreover, the valve V1 for controlling the flowing-in of the water and the valves V2 and V3 used for switching the gas flow path of the exhaust pipe are not particularly limited, and valves (commercially available valves or the like) having known structures capable of controlling the flow rate, the flow velocity, the pressure, and the like of a fluid (an inert gas, water (steam), or exhaust gas) can be used as appropriate.

The hydrogen production apparatus shown in FIG. 5 is an apparatus configured to produce hydrogen by performing the step (A) and the step (B) in the reaction vessel 11. Hereinafter, a method is described which is preferable in the case where the steps (A) and (B) are performed by using the hydrogen production apparatus of the embodiment shown in FIG. 5. Note that the temperature conditions, the pressure conditions, the times, and the like described for the above-described method for producing hydrogen of the present invention may be employed, as appropriate, as the conditions, the times, and the like for performing the step (A) and the step (B).

First, a method preferable for performing the step (A) is described. When the step (A) is performed by using the apparatus shown in FIG. 5, first, the valves V1 and V2 are closed. When the inert gas is supplied from the inert gas supply means 13 in this manner, the inert gas first flows into the piping P (the direction in which the gas flows: A1). Then, the inert gas flows into the reaction vessel 11. After that, the inert gas in the reaction vessel 11 flows into the exhaust pipe 14 (the direction in which the gas flows: A3). Then, the inert gas flows into the pipe 14b side of the exhaust pipe 14, where the valve is open, and is discharged to the outside (the direction in which the gas flows: A5). In addition, for performing the step (A), while the inert gas is supplied from the inert gas supply means 13 into the reaction vessel 11, the inside of the reaction vessel 11 is heated by using the unillustrated heating means (for example, the light condensing means). The temperature inside the reaction vessel 11 is raised by using the heating means as described above, so that the temperature inside the reaction vessel 11 and the temperature of the catalyst 10 placed therein are raised to a temperature (for example, 400 to 900° C.) preferable for thermally reducing the catalyst 10, and the temperature is kept. Then, while the inert gas is caused to flow into the reaction vessel 11, the heating at the temperature is performed. Thus, the catalyst 10 is thermally reduced, and oxygen is released from the composite metal oxide constituting the catalyst 10.

Next, a method preferable for performing the step (B) is described. When the step (B) is performed by using the apparatus shown in FIG. 5, first, after the catalyst 10 is sufficiently reduced by performing the step (A) as described above, the valve V3 is closed, and the valve V2 is opened, so that the gas discharged from the inside of the reaction vessel 11 can flow into the piping 14a side of the exhaust pipe 14, and can be discharged to the outside (the direction in which the gas flows: A4). Next, the temperature inside the vessel 11 is adjusted as appropriate by using the heating means or the like, and the temperature is kept, so that the temperature inside the reaction vessel 11 can be a temperature (for example, 50 to 600° C.) preferable for performing the step (B). Then, the valve V1 is opened, and water (in this case, steam) is added to the inert gas flowing in the piping P. Thus, water is caused to flow into the reaction vessel 11, together with the inert gas. Thus, water can be brought into contact with the catalyst 10 reduced in the step (A) in the reaction vessel 11. In addition, by bringing water into contact with the catalyst 10 reduced in the step (A) as described above, water is split by the catalyst 10, so that hydrogen is generated, and the catalyst 10 is oxidized. In addition, by causing the water splitting reaction to proceed sufficiently, the composite metal oxide in the catalyst 10 is sufficiently oxidized. Hence, the composite metal oxide can have the same state as that before the reduction in the step (A).

Hydrogen can be produced by splitting water by performing the step (A) and the step (B) for performing the reduction and oxidation of the composite metal oxide as described above. Hence, hydrogen can be produced continuously by repeatedly performing a cycle composed of the steps (A) and (B). When the hydrogen production catalyst of the present invention is used as described above, hydrogen can be produced efficiently by the step (A) and the step (B).

Hereinabove, the preferred embodiment of the hydrogen production apparatus of the present invention is described with reference to FIG. 5. However, the hydrogen production apparatus of the present invention is not limited to the embodiment.

For example, the water supply means 12 and the inert gas supply means 13 are connected to the reaction vessel 11 via the piping P having branches in the embodiment shown in FIG. 5. However, the structure of the piping P is not particularly limited in the hydrogen production apparatus of the present invention. An example of other structures of the piping P is as follows. Specifically, a structure may be employed in which two pipes are used, the water supply means 12 is connected to the reaction vessel 11 via one of the pipes, and the inert gas supply means 13 is connected to the reaction vessel 11 via the other pipe, so that the water supply means 12 and the inert gas supply means 13 are connected to the reaction vessel 11 via different pipes, respectively. Moreover, the water supply means 12 and/or the inert gas supply means 13 may be connected to the reaction vessel 11 without using the piping P, by, for example, direct connection of a supply port of the water supply means 12 to the reaction vessel 11 without the piping P, or the like.

In addition, the exhaust pipe 14 has the branched structure in the embodiment shown in FIG. 5. However, the structure of the exhaust pipe is not particularly limited in the hydrogen production apparatus of the present invention. Two pipes having no branches may be connected to different positions of the reaction vessel 11 thereof, respectively, and these two pipes may be used as the exhaust pipe. In this case, one of the two exhaust pipes may be used as an exhaust pipe for collecting the hydrogen gas, and the other exhaust pipe may be used as a pipe for discharging the gas containing no hydrogen gas, depending on the step being performed.

Moreover, the valves V1 to V3 are provided in the piping in the embodiment shown in FIG. 5. However, the presence or absence of the use of the valves, the positions of the valves disposed, and the like are not particularly limited in the hydrogen production apparatus of the present invention, as long as the directions and the like of the flows of the water supplied from the water supply means 12, the gas supplied from the inert gas supply means 13, and the like can be controlled, as appropriate, depending on the conditions for performing the steps (A) and (B). The designs may be changed as appropriate.

EXAMPLES

Hereinafter, the present invention will be described more specifically on the basis of Examples and Comparative Examples. However, the present invention is not limited to Examples below.

Example 1

Production of Hydrogen Production Catalyst

A hydrogen production catalyst comprising a composite metal oxide of cerium oxide and praseodymium oxide was produced as follows. Specifically, first, a reaction solution was obtained by dissolving 27.4 g of diammonium cerium (IV) nitrate, 10.9 g of praseodymium(III) nitrate hexahydrate, and 48 g of urea in 400 mL of ion-exchanged water. Next, the reaction solution was heated, and stirred for 8 hours while the temperature was kept at 98° C. Thus, precipitates were formed. Note that the precipitates were generated based on the generation of ammonia due to decomposition of urea in the reaction solution during the stirring of the reaction solution with the temperature being kept at 98° C. Subsequently, the thus generated precipitates were washed in water heated to 100° C., and then filtered. The obtained solid content was dried at 95° C. for 20 hours. After that, the dried solid content was calcined at 500° C. for 5 hours, and then at 650° C. for 5 hours. Thus, a hydrogen production catalyst comprising a composite metal oxide of cerium oxide and praseodymium oxide was obtained (the atomic ratio (Ce:Pr) of Ce to Pr was 2:1). Note that the obtained composite metal oxide was subjected to a measurement (XRD measurement) by using an XRD measurement apparatus (manufactured by Rigaku Corporation under the trade name of "RINT-TTR") and by employing the same method as the method for measuring an average primary particle diameter which will be described later. This measurement showed that the composite metal oxide had a fluorite-type crystal structure, and had an average primary particle diameter of 13 nm. In addition, the obtained composite metal oxide had a specific surface area (BET) of 62 $m^2/g$.

<Hydrogen Production Test>

By using the thus obtained hydrogen production catalyst, hydrogen was produced by performing the following reduction step and oxidation step (hydrogen production step). Note that, in the production of hydrogen, a pelletized catalyst was used which was obtained by molding the hydrogen production catalyst by the cold isostatic pressing method (CIP: 1000 $kg/cm^2$) followed by grinding, and which had an average diameter of 0.75 mm. In addition, in the production of hydrogen, 0.32 g of the pelletized hydrogen production catalyst was placed in a normal pressure fixed bed flow-type reactor (manufactured by Hemmi Slide Rule Co., Ltd. under the trade name of "TP5000"). In addition, a microsyringe was connected to a gas flow path of the normal pressure fixed bed flow-type reactor, through which the gas flowed before coming into contact with the catalyst, so that water could be supplied into the gas flow path. Moreover, before the following reduction step is performed, the catalyst was subjected to a pretreatment in which the catalyst was heat treated in an oxygen stream at 650° C. for 20 minutes to achieve a state where the metal oxide in the catalyst was sufficiently oxidized.

<Reduction Step>

While Ar gas (inert gas) was being supplied at a gas flow rate of 40 mL/minute to the hydrogen production catalyst, the temperature was raised at a rate of temperature rise of 20° C./minute from room temperature (25° C.) to 800° C. Then, a condition where the catalyst bed temperature was 800° C. was kept for 1 hour. The hydrogen production catalyst was reduced by keeping the hydrogen production catalyst in the inert gas atmosphere under a temperature condition of 800° C. for 1 hour.

<Oxidation Step (Hydrogen Production Step)>

After the reduction step was performed, Ar gas (inert gas) was supplied to the hydrogen production catalyst at a gas flow rate of 40 mL/minute, and thus the catalyst bed temperature was lowered to 450° C. Next, while Ar gas (inert gas) was being supplied to the hydrogen production catalyst at a gas flow rate of 40 mL/minute with the catalyst bed temperature being kept at 450° C., 80 µL of ion-exchanged water (liquid) was added into the Ar gas yet to come into contact with the hydrogen production catalyst by using the microsyringe at 2-minute intervals for 30 minutes. Thus, Ar gas containing steam (water vaporized in the Ar gas) was brought into contact with the hydrogen production catalyst. In this manner, after the reduction step was performed, water (steam) was brought into contact with the hydrogen production catalyst in an inert gas atmosphere under a temperature condition of 450° C. Thus, the hydrogen production catalyst was oxidized, and hydrogen was produced by splitting water.

Example 2

A hydrogen production catalyst comprising a composite metal oxide of cerium oxide and praseodymium oxide (the atomic ratio (Ce:Pr) of Ce to Pr was 1:2) was obtained in the same manner as in Example 1, except that the amount of diammonium cerium(IV) nitrate used was changed from 27.4 g to 13.7 g, and that the amount of praseodymium(III) nitrate hexahydrate used was changed from 10.9 g to 21.8 g. Note that an XRD measurement conducted in the same manner as in Example 1 showed that the obtained composite metal oxide had a fluorite-type crystal structure, and had an average primary particle diameter of 21 nm. In addition, the obtained composite metal oxide had a specific surface area (BET) of 30 $m^2/g$. Moreover, a hydrogen production test was conducted in the same manner as in Example 1, except that the thus obtained hydrogen production catalyst was used.

Example 3

A hydrogen production catalyst comprising a composite metal oxide of cerium oxide, praseodymium oxide, and aluminum oxide (the mass ratio between the oxides (cerium oxide:praseodymium oxide:aluminum oxide) was 62.7:7.3:30.0, and the atomic ratio (Ce:Pr) of Ce to Pr in the composite metal oxide was 89.4:10.6) was obtained in the same manner as in Example 1, except that the reaction solution was replaced with a reaction solution obtained by dissolving 15.0 g of diammonium cerium(IV) nitrate, 1.41 g of praseodymium(III) nitrate hexahydrate, 16.6 g of aluminum nitrate nonahydrate, and 48 g of urea in 400 g (400 mL) of ion-exchanged water. Note that an XRD measurement conducted in the same manner as in Example 1 showed that the obtained composite metal oxide had a crystal phase having a fluorite-type crystal structure, and had an average primary particle diameter of 11 nm. Note that, no crystal phase originated from alumina was observed. In addition, the obtained composite metal oxide had a specific surface area (BET) of 142 m$^2$/g. Moreover, a hydrogen production test was conducted in the same manner as in Example 1, except that the thus obtained hydrogen production catalyst was used.

Example 4

Production of Hydrogen Production Catalyst

[Colloid Solution Preparation Step]

First, a first raw material solution containing cations serving as raw materials of a composite metal oxide was prepared by dissolving 10.0 g of ammonium cerium nitrate, 0.98 g of praseodymium(III) nitrate hexahydrate, and 11.1 g of aluminum nitrate nonahydrate in 250 g of ion-exchanged water. Subsequently, a second raw material solution was prepared by dissolving 39 g of nitric acid and 31.3 g of polyethylenimine shown in the following formula (1) and having a weight average molecular weight of 10000 in 180 g of ion-exchanged water.

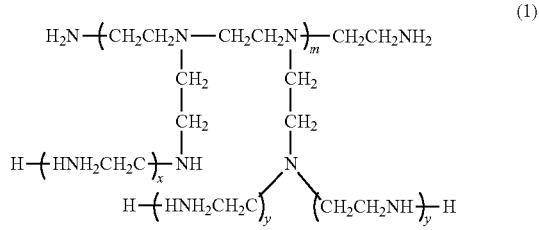
(1)

Next, a colloid solution was prepared by using the production apparatus (SUPER AGITATION REACTOR) shown in FIG. 1. Note that the stator 113 used was of a 48-hole type in which 24 nozzles 116A and 24 nozzles 116B were provided. Then, an end of the homogenizer 110 was set to be immersed in a 100-ml beaker 120 as shown in FIG. 1. While the rotor 111 of the homogenizer 110 was rotated at a rotation speed of 3400 rpm, the first raw material solution and the second raw material solution were each supplied to a region between the rotor 111 and the inner stator 113 through the nozzles 116A or the nozzles 116B at a supply speed of 12.5 ml/min by using a tube pump (not illustrated), and were mixed with each other. Thus, a colloid solution (pH 4.0) was prepared.

Note that the outer diameter of the rotor 111 was 18.0 mm, the inner diameter of the rotor 111 was 12.2 mm, the inner diameter of the outer stator 112 was 18.8 mm, the gap between the rotor 111 and the outer stator 112 was 0.4 mm, and the shear rate (the shear rate outside the rotor) in a region between the rotor 111 and the outer stator 112 was 8000 sec$^{-1}$. In addition, the outer diameter of the inner stator 113 was 11.8 mm, the gap between the rotor 111 and the inner stator 113 was 0.2 mm, and the shear rate (the shear rate inside the rotor) in the region between the rotor 111 and the inner stator 113 was 4600 sec$^{-1}$. In addition, the time taken from the introduction of the first raw material solution and the second raw material solution into the region to the completion of the homogeneous mixing was 0.37 msec. Here, the time taken to the completion of homogeneous mixing is defined as the time taken for the raw material solution A or the raw material solution B discharged from each of the nozzles 116A or the nozzles 116E to reach the corresponding adjacent the nozzle 116B or nozzle 116A as a result of the rotation by the rotor 111.

[Gelling Treatment Step]

A suspension was obtained by adjusting the pH of the colloid solution obtained as described above to 7.0 by a method in which while the colloid solution was propeller stirred under a condition of 300 rpm, ethylenediamine was added rapidly (within 5 seconds).

[Heat Treatment Step]

The obtained suspension was degreased by being held in the air at 350° C. for 5 hours, and was further subjected to a heat treatment of holding in the air at 900° C. for 5 hours. Thus, a hydrogen production catalyst comprising a composite metal oxide of cerium oxide, praseodymium oxide, and aluminum oxide (the mass ratio between the oxides (cerium oxide:praseodymium oxide:aluminum oxide) was 62.7:7.3: 30.0, and the atomic ratio (Ce:Pr) of Ce to Pr in the composite metal oxide was 89.4:10.6) was obtained.

Note that the thus obtained composite metal oxide was subjected to an XRD measurement in the same manner as in Example 1. The measurement showed that the obtained composite metal oxide contained a crystal phase having a fluorite-type crystal structure, and had an average primary particle diameter of 11 nm. In addition, the obtained composite metal oxide had a specific surface area (BET) of 136 m$^2$/g. Moreover, a hydrogen production test was conducted in the same manner as in Example 1, except that the thus obtained hydrogen production catalyst was used.

Example 5

Production of Hydrogen Production Catalyst

A hydrogen production catalyst comprising a composite metal oxide of cerium oxide, praseodymium oxide, and aluminum oxide (the mass ratio between the oxides (cerium oxide:praseodymium oxide:aluminum oxide) was 46.8:23.2: 30.0, and the atomic ratio (Ce:Pr) of Ce to Pr in the composite metal oxide was 2:1) was obtained in the same manner as in Example 4, except that a first raw material solution and a second raw material solution prepared as shown below were used as the first raw material solution and the second raw material solution.

[Preparation of First Raw Material Solution]

The first raw material solution containing cations serving as raw materials of the composite metal oxide was prepared by dissolving 14.9 g of ammonium cerium nitrate, 5.95 g of praseodymium(III) nitrate hexahydrate, and 22.1 g of aluminum nitrate nonahydrate in 500 g of ion-exchanged water.

[Preparation of Second Raw Material Solution]

The second raw material solution was prepared by dissolving 80 g of nitric acid and 62.7 g of a polyethylenimine shown in the above-described formula (1) and having a weight average molecular weight of 10000 in 360 g of ion-exchanged water.

Note that the thus obtained composite metal oxide was subjected to an XRD measurement in the same manner as in Example 1. The measurement showed that the obtained composite metal oxide contained a crystal phase having a fluorite-type crystal structure, and had an average primary particle diameter of 10 nm. In addition, the obtained composite metal oxide had a specific surface area (BET) of 123 m²/g. Moreover, a hydrogen production test was conducted in the same manner as in Example 1, except that the thus obtained hydrogen production catalyst was used.

Comparative Example 1

A hydrogen production catalyst comprising cerium oxide was obtained in the same manner as in Example 1, except that no praseodymium(III) nitrate hexahydrate was used. Note that an XRD measurement conducted in the same manner as in Example 1 showed that the obtained cerium oxide had a fluorite-type crystal structure, and had an average primary particle diameter of 11 nm. In addition, the obtained metal oxide had a specific surface area (BET) of 37 m²/g. Moreover, a hydrogen production test was conducted in the same manner as in Example 1, except that the thus obtained hydrogen production catalyst was used.

Comparative Example 2

A hydrogen production catalyst comprising praseodymium oxide was obtained in the same manner as in Example 1, except that no diammonium cerium(IV) nitrate was used, and that the amount of praseodymium(III) nitrate hexahydrate used was changed from 10.9 g to 32.6 g. Note that an XRD measurement conducted in the same manner as in Example 1 showed that the obtained praseodymium oxide had a fluorite-type crystal structure, and had an average primary particle diameter of 27 nm. In addition, the obtained metal oxide had a specific surface area (BET) of 2.7 m²/g. Moreover, a hydrogen production test was conducted in the same manner as in Example 1, except that the thus obtained hydrogen production catalyst was used.

Comparative Example 3

A hydrogen production catalyst comprising a composite metal oxide of cerium oxide and chromium oxide (the atomic ratio (Ce:Cr) of Ce to Cr was 2:1) was obtained in the same manner as in Example 1, except that 10.0 g of chromium(III) nitrate nonahydrate was used instead of 10.9 g of the praseodymium(III) nitrate hexahydrate. Note that an XRD measurement conducted in the same manner as in Example 1 showed that the obtained composite metal oxide had a fluorite-type crystal structure, and had an average primary particle diameter of 17 nm. Moreover, a hydrogen production test was conducted in the same manner as in Example 1, except that the thus obtained hydrogen production catalyst was used.

Comparative Example 4

A hydrogen production catalyst comprising a composite metal oxide of cerium oxide and manganese oxide (the atomic ratio (Ce:Mn) of Ce to Mn was 2:1) was obtained in the same manner as in Example 1, except that 7.18 g of manganese (II) nitrate hexahydrate was used instead of 10.9 g of the praseodymium(III) nitrate hexahydrate. Note that an XRD measurement conducted in the same manner as in Example 1 showed that the obtained composite metal oxide had a fluorite-type crystal structure, and had an average primary particle diameter of 10 nm. Moreover, a hydrogen production test was conducted in the same manner as in Example 1, except that the thus obtained hydrogen production catalyst was used.

Comparative Example 5

A hydrogen production catalyst comprising a composite metal oxide of cerium oxide and iron oxide (the atomic ratio (Ce:Fe) of Ce to Fe was 2:1) was obtained in the same manner as in Example 1, except that 10.1 g of iron (III) nitrate nonahydrate was used instead of 10.9 g of the praseodymium (III) nitrate hexahydrate. Note that an XRD measurement conducted in the same manner as in Example 1 showed that the obtained composite metal oxide had a fluorite-type crystal structure, and had an average primary particle diameter of 11 nm. Moreover, a hydrogen production test was conducted in the same manner as in Example 1, except that the thus obtained hydrogen production catalyst was used.

Comparative Example 6

A hydrogen production catalyst comprising a composite metal oxide of cerium oxide and cobalt oxide was produced as follows. Specifically, first, a solution was obtained by dissolving 27.4 g of diammonium cerium(IV) nitrate and 7.28 g of cobalt(II) nitrate hexahydrate in 200 mL of ion-exchanged water. Next, an aqueous solution obtained by dissolving 19.9 g of sodium carbonate in 200 mL of ion-exchanged water was added at once to the obtained solution. After that, the mixture was stirred for 8 hours with the temperature being kept at 98° C. Thus, precipitates were generated. The thus generated precipitates were washed in water heated to 100° C., and then filtered. The obtained solid content was dried at 95° C. for 20 hours. After that, the dried solid content was calcined at 500° C. for 5 hours, and then further calcined at 650° C. for 5 hours. Thus, a composite metal oxide of cerium oxide and cobalt oxide (the atomic ratio (Ce:Co) of Ce to Co was 2:1) was obtained. Note that an XRD measurement conducted in the same manner as in Example 1 showed that the obtained composite metal oxide had a fluorite-type crystal structure, and had an average primary particle diameter of 16 nm. Moreover, a hydrogen production test was conducted in the same manner as in Example 1, except that the thus obtained hydrogen production catalyst was used.

Comparative Example 7

A hydrogen production catalyst comprising a composite metal oxide of cerium oxide and nickel oxide (the atomic ratio (Ce:Ni) of Ce to Ni was 2:1) was obtained in the same manner as in Comparative Example 6, except that 7.27 g of nickel(II) nitrate hexahydrate was used instead of 7.28 g of the cobalt (II) nitrate hexahydrate. Note that an XRD measurement conducted in the same manner as in Example 1 showed that the obtained composite metal oxide had a fluorite-type crystal structure, and had an average primary particle diameter of 15 nm. Moreover, a hydrogen production test was conducted in the same manner as in Example 1, except that the thus obtained hydrogen production catalyst was used.

Comparative Example 8

A hydrogen production catalyst comprising a composite metal oxide of cerium oxide and copper oxide (the atomic ratio (Ce:Cu) of Ce to Cu was 2:1) was obtained in the same manner as in Comparative Example 6, except that 6.04 g of copper(II) nitrate trihydrate was used instead of 7.28 g of the cobalt (II) nitrate hexahydrate. Note that an XRD measurement conducted in the same manner as in Example 1 showed that the obtained composite metal oxide had a fluorite-type crystal structure, and had an average primary particle diameter of 15 nm. Moreover, a hydrogen production test was conducted in the same manner as in Example 1, except that the thus obtained hydrogen production catalyst was used.

Comparative Example 9

Production of Hydrogen Production Catalyst

A hydrogen production catalyst comprising a composite metal oxide of cerium oxide, zirconium oxide, and aluminum oxide (the mass ratio between the oxides (cerium oxide:zirconium oxide:aluminum oxide) was 38.8:11.8:49.4) was obtained in the same manner as in Example 4, except that a first raw material solution and a second raw material solution prepared as shown below were used as the first raw material solution and the second raw material solution.

[Preparation of First Raw Material Solution]

The first raw material solution containing cations serving as raw materials of the composite metal oxide was prepared by dissolving 9.58 g of ammonium cerium nitrate, 1.99 g of zirconium nitrate dihydrate, and 28.15 g of aluminum nitrate nonahydrate in 500 g of ion-exchanged water.

[Preparation of Second Raw Material Solution]

The second raw material solution was prepared by dissolving 80 g of nitric acid and 62.7 g of a polyethylenimine shown in the above-described formula (1) and having a weight average molecular weight of 10000 in 360 g of ion-exchanged water.

Note that the thus obtained composite metal oxide was subjected to an XRD measurement in the same manner as in Example 1. The measurement showed that the obtained composite metal oxide contained a crystal phase having a fluorite-type crystal structure, and had an average primary particle diameter of 9 nm. In addition, the obtained composite metal oxide had a specific surface area (BET) of 179 $m^2/g$. Moreover, a hydrogen production test was conducted in the same manner as in Example 1, except that the thus obtained hydrogen production catalyst was used.

[Evaluation of Characteristics of Hydrogen Production Catalysts Obtained in Examples 1 to 5 and Comparative Examples 1 to 9]

<Measurement of Amount of Oxygen Released in Reduction Step>

Figure 6:
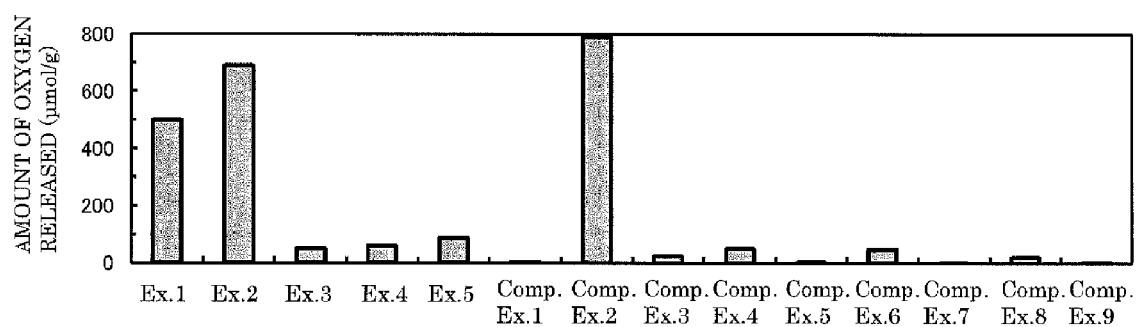
FIG. 6 is a graph showing the amounts of oxygen released from hydrogen production catalysts obtained in Examples 1 to 5 and Comparative Examples 1 to 8.

The amount (unit: μmol/g) of oxygen released per gram of each of the hydrogen production catalysts obtained in Examples 1 to 5 and Comparative Examples 1 to 9 was determined as follows. Specifically, in the reduction step carried out in the above-described hydrogen production test, the amount of oxygen contained in the gas (outlet gas) having been brought into contact with the hydrogen production catalyst was measured with a mass spectrometer all through the period of the temperature rise from room temperature to 800° C. at 20° C./minute and the keeping under a temperature condition of 800° C. for 1 hour. Thus, the total amount of oxygen released from the hydrogen production catalyst in the reduction step was determined. Thereby, the amount (unit: μmol/g) of oxygen released per gram of each of the hydrogen production catalysts was determined. FIG. 6 and Table 1 show the obtained results.

TABLE 1

| | Amount of oxygen released (μmol/g) |
|---|---|
| Example 1 | 500 |
| Example 2 | 690 |
| Example 3 | 52 |
| Example 4 | 60 |
| Example 5 | 88 |
| Comp. Ex. 1 | 4.2 |
| Comp. Ex. 2 | 790 |
| Comp. Ex. 3 | 25 |
| Comp. Ex. 4 | 50 |
| Comp. Ex. 5 | 2.9 |
| Comp. Ex. 6 | 50 |
| Comp. Ex. 7 | 1.1 |
| Comp. Ex. 8 | 20 |
| Comp. Ex. 9 | 3.0 |

As is apparent from the results shown in FIG. 6 and Table 1, in each of the cases (Examples 1 and 2) where the hydrogen production catalysts of the present invention comprising the composite metal oxides of cerium oxide and praseodymium oxide were used and the case (Comparative Example 2) of the hydrogen production catalyst comprising only praseodymium oxide, it was found that the thermal reduction of the catalyst proceeded sufficiently, and a sufficient amount of oxygen was released. Note that a sufficient amount of oxygen was released from the hydrogen production catalyst (Comparative Example 2) comprising only praseodymium oxide. The present inventors speculate that this result was brought about because of the fact that praseodymium was more stable in the trivalent state than in the tetravalent state in the inert gas atmosphere at 800° C. On the other hand, it was found that the thermal reduction of the hydrogen production catalyst (Comparative Example 1) comprising only cerium oxide hardly proceeded.

In addition, also in the cases (Examples 3 to 5) where the hydrogen production catalysts of the present invention were used, oxygen release was observed in amounts of 52 μmol/g or more. The amounts of oxygen released from the hydrogen production catalysts obtained in Examples 3 to 5 were larger than the amounts of oxygen released from the hydrogen production catalysts obtained in Comparative Examples 1 and 3 to 9, which indicated that the thermal reduction of the catalysts obtained in Examples 3 to 5 proceeded sufficiently.

In addition, as is apparent from the results shown in FIG. 6 and Table 1, the following results were obtained regarding the hydrogen production catalysts (Comparative Examples 3 to 8) each comprising a composite metal oxide represented by the formula: $CeO_2$-$MO_x$ (where, M represents an element selected from Cr, Mn, Fe, Co, Ni, and Cu, and x represents a positive number). Specifically, in the case (Comparative Example 4) where the hydrogen production catalyst comprised the composite metal oxide ($CeO_2$—$MnO_x$) of cerium oxide and manganese oxide and in the case (Comparative Example 6) where the hydrogen production catalyst comprised the composite metal oxide ($CeO_2$—$CoO_x$) of cerium oxide and cobalt oxide, oxygen release from each of the catalysts was observed in an amount of about 50 μmol/g. However, in the cases (Comparative Examples 3, 5, 7, and 8) where the hydrogen production catalysts comprised the other composite metal oxides, the amount of oxygen released from each catalyst was 25 μmol/g or less, and almost no oxygen release was detected. From these results, it was found that especially in the cases of the hydrogen production catalysts which were obtained in Comparative Examples 3, 5, 7, and 8 and which comprised the composite metal oxide of cerium oxide with one of chromium oxide, iron oxide, nickel oxide, and copper oxide, the composite metal oxides could not be reduced sufficiently under the temperature condition of 800° C. Note that the thermal reduction of the hydrogen production catalysts obtained in Comparative Examples 3, 5, 7, and 8 hardly proceeded. The present inventors speculate that this was resulted from deterioration of the hydrogen production catalysts in the pretreatment at 650° C.

In addition, the amount of oxygen released from the hydrogen production catalyst obtained in Comparative Example 9 and comprising the composite metal oxide of cerium oxide, zirconium oxide, and aluminum oxide was 3.0 μmol/g, and almost no oxygen release was detected. From these results, it was found that the composite metal oxide could not be sufficiently reduced under the temperature condition of 800° C. in the case of the hydrogen production catalyst obtained in Comparative Example 9.

Note that, for the hydrogen production catalyst (Comparative Example 3) comprising the composite metal oxide of cerium oxide and chromium oxide, an oxidation step of performing a heat treatment in an oxygen stream at 650° C. for 20 minutes and a reduction step of raising the temperature from room temperature (25° C.) to 800° C. at a rate of temperature rise of 20° C./minute in an Ar gas stream (gas flow rate: 40 mL/minute), and keeping a condition where the catalyst bed temperature was 800° C. for 1 hour were repeated three times, and the amount of oxygen released from the hydrogen production catalyst in each reduction step was determined. As a result, the amounts of oxygen released in the reduction steps were 25 μmol/g for the first time, 12 μmol/g for the second time, and 3.8 μmol/g for the third time, indicating that the amount of oxygen released decreased remarkably every time the step is repeated (note that the same method as that employed for measuring the amount of oxygen released per gram of the hydrogen production catalyst in the reduction step conducted in the above-described hydrogen production test was employed as a method for measuring the amount of oxygen released). On the other hand, the same steps (the oxidation step and the reduction step) were repeated three times for the hydrogen production catalyst obtained in Example 1 and comprising the composite metal oxide of cerium oxide and praseodymium oxide, and the amount of oxygen released from the hydrogen production catalyst in each reduction step was determined. As a result, the amounts of oxygen released in the reduction steps were 500 mmol/g for the first time, 520 μmol/g for the second time, and 520 μmol/g for the third time, and hardly changed. Accordingly, it was found that the amount of oxygen released in the reduction step was maintained at a sufficiently high level even in a case where the oxidation step and the reduction step were repeated. In addition, also for the hydrogen production catalyst obtained in Example 2, the amount of oxygen released from the hydrogen production catalyst in each reduction step was determined in the same manner. As a result, the amounts of oxygen released in the reduction steps were 690 μmol/g for the first time, 760 μmol/g for the second time, and 750 μmol/g for the third time, and were hardly changed. Accordingly, it was found that the amount of oxygen released in the reduction step was maintained at a sufficiently high level, even when the oxidation step and the reduction step were repeated. From these results, it can be understood that, when compared with the composite metal oxide (Comparative Example 3) of cerium oxide and chromium oxide, the hydrogen production catalysts of the present invention (Examples 1 and 2) had higher levels of heat resistance, the performances can be sufficiently maintained (thermal degradation and the like can be prevented sufficiently) also when the reduction step and the oxidation step are performed repeatedly, and the reduction step and the oxidation step can be performed more efficiently.

<Measurement of Amount of Hydrogen Generated in Oxidation Step>

Figure 7:
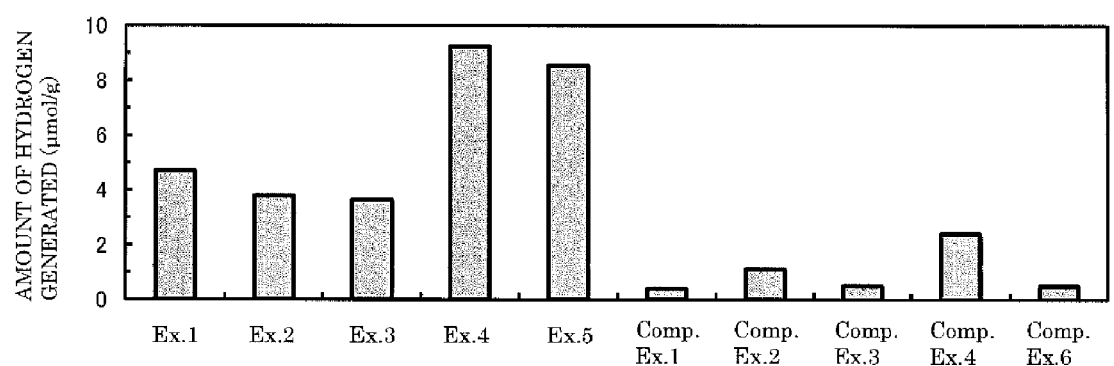
FIG. 7 is a graph showing the amounts of hydrogen generated by the hydrogen production catalysts obtained in Examples 1 to 5 and Comparative Examples 1 to 4 and 6.

The amount (unit: μmol/g) of hydrogen generated per gram of each the hydrogen production catalysts obtained in Examples 1 to 5 and Comparative Examples 1 to 4, and 6 was measured as follows. Specifically, in the oxidation step (hydrogen production step) carried out in the above-described hydrogen production test, the amount of hydrogen contained in the gas (outlet gas) having been brought into contact with the hydrogen production catalyst was measured with a mass spectrometer all through the oxidation step, and thus the total amount of hydrogen generated by the hydrogen production catalyst in the oxidation step was determined. Thereby, the amount (unit: μmol/g) of hydrogen generated per gram of each the hydrogen production catalysts was determined. Note that the amounts of hydrogen generated by the hydrogen production catalysts obtained in Comparative Examples 5, and 7 to 9 were not measured because of the following reason. Specifically, in view of the amounts of oxygen released shown in FIG. 6 and Table 1, it is clear that the hydrogen production catalysts obtained in Comparative Examples 5, and 7 to 9 were theoretically not able to sufficiently produce hydrogen in comparison with the hydrogen production catalysts obtained in Comparative Examples 4 and 6, and it is possible to infer the hydrogen generation performances thereof from the amounts of hydrogen generated by the hydrogen production catalysts obtained in Comparative Examples 1 to 4, and 6. FIG. 7 and Table 2 show the obtained results.

TABLE 2

| | Amount of hydrogen generated (μmol/g) |
|---|---|
| Example 1 | 4.7 |
| Example 2 | 3.8 |
| Example 3 | 3.6 |
| Example 4 | 9.2 |
| Example 5 | 8.6 |
| Comp. Ex. 1 | 0.4 |
| Comp. Ex. 2 | 1.1 |
| Comp. Ex. 3 | 0.5 |
| Comp. Ex. 4 | 2.4 |
| Comp. Ex. 5 | — |
| Comp. Ex. 6 | 0.5 |
| Comp. Ex. 7 | — |
| Comp. Ex. 8 | — |
| Comp. Ex. 9 | — |

As is apparent from the results shown in FIG. 7 and Table 2, it was found, in each of the cases (Examples 1 to 5) where the hydrogen production catalysts of the present invention comprising the composite metal oxides of cerium oxide and praseodymium oxide were used, that the amount of hydrogen generated was at a sufficiently high level, and that hydrogen was successfully produced by the reduction step and the oxidation step efficiently. In particular, the hydrogen production catalysts of the present invention comprising the composite metal oxides obtained in Examples 4 and 5 achieved the amounts of hydrogen generated at sufficiently high levels. On the other hand, it was found that the hydrogen production catalysts obtained in Comparative Examples 1 to 4, and 6 were not capable of producing hydrogen sufficiently. Note that, although the amount of oxygen released from the hydrogen production catalyst (Comparative Example 2) comprising only praseodymium oxide in the reduction step was larger than those from the composite metal oxides (Examples 1 to 5) of cerium oxide and praseodymium oxide, almost no hydrogen was generated by the hydrogen production catalyst (Comparative Example 2) comprising only praseodymium oxide. The present inventors speculate that these results were attributable to the fact that since praseodymium was relatively stable in the trivalent state under a temperature condition of 450° C., the reaction in which the catalyst was oxidized and also water was split did not easily proceed with the hydrogen production catalyst (Comparative Example 2) comprising only praseodymium oxide, when water is brought into contact with the catalyst.

<Measurement of Average Primary Particle Diameter>

The average primary particle diameter of each composite metal oxide was measured as follows. First, by using a measurement sample described below, an X-ray diffraction (XRD) pattern of the composite metal oxide was measured with a powder X-ray diffraction apparatus (manufactured by Rigaku Corporation under the trade name of "RINT-TTR") under conditions of a scan step of 0.02°, divergence and scattering slits of ½ deg, a receiving slit of 0.15 mm, CuKα radiation, 50 kV, 300 mA, and scans for 0.5 sec/point. The average primary particle diameter was calculated based on the half width of the peak attributable to the (111) plane of crystals of the composite metal oxide in the thus obtained XRD pattern by calculation based on the Scherrer equation:

$$D = 0.9\lambda/\beta \cos\theta$$

(where D represents the crystallite diameter, λ represents the wavelength of X-rays used, β represents the half width of the XRD of the measurement sample, and θ represents the diffraction angle).

Figure 8:
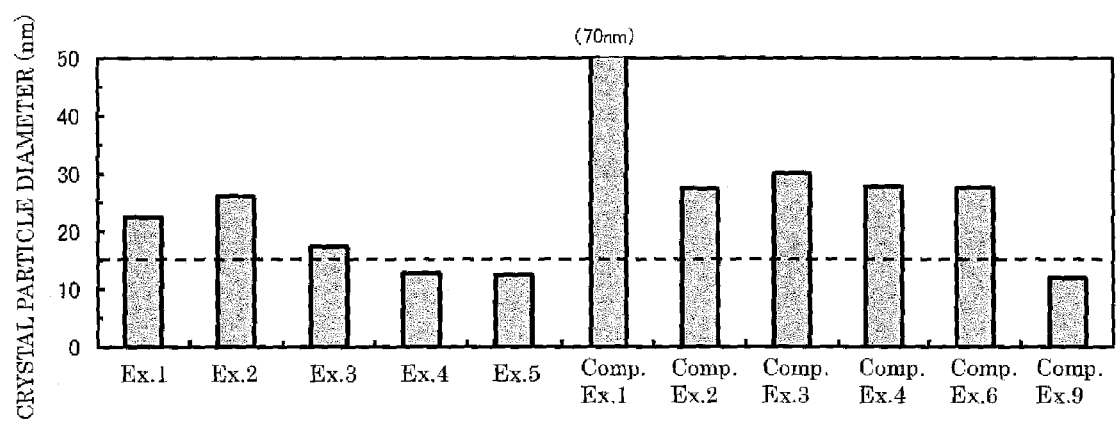
FIG. 8 is a graph showing average primary particle diameters of composite metal oxides which were obtained in Examples 1 to 5, Comparative Examples 1 to 4, 6, and 9 and which were thermally reduced.

Note that, in the measurement, the composite metal oxides prepared in Examples 1 to 5 and Comparative Examples 1 to 4, 6, and 9 were measured by directly using, as the measurement samples, the composite metal oxides as prepared, and also measured by using, as the measurement samples, the composite metal oxides (after thermal reduction) subjected to a heat treatment (thermal reduction treatment) under an Ar gas (inert gas) atmosphere at 800° C. for 1 hour. Table 3 shows the obtained results. In addition, FIG. 8 shows the average primary particle diameters of the composite metal oxides obtained in Examples 1 to 5 and Comparative Examples 1 to 4, 6, and 9, and subjected to the thermal reduction. Note that since the thermal reduction treatment was conducted under the same temperature condition (800° C.) as that in the reduction step employed in the hydrogen production test, the average primary particle diameters of the composite metal oxides subjected to the thermal reduction treatment can be considered to take the same values as (can be regarded as equivalent values to) those of the average primary crystal particle diameters of the composite metal oxides before the oxidation step in the hydrogen production test.

TABLE 3

| | Average primary crystal particle diameter (Unit: nm) | |
|---|---|---|
| | After preparation | After thermal reduction |
| Example 1 | 13 | 23 |
| Example 2 | 21 | 26 |
| Example 3 | 11 | 17 |
| Example 4 | 11 | 13 |

TABLE 3-continued

| | Average primary crystal particle diameter (Unit: nm) | |
|---|---|---|
| | After preparation | After thermal reduction |
| Example 5 | 10 | 13 |
| Comp. Ex. 1 | 12 | 70 |
| Comp. Ex. 2 | 21 | 27 |
| Comp. Ex. 3 | 17 | 30 |
| Comp. Ex. 4 | 10 | 28 |
| Comp. Ex. 6 | 16 | 28 |
| Comp. Ex. 9 | 9 | 12 |

As is apparent from the results shown in FIG. 8 and Table 3, the values of the average primary particle diameters of the composite metal oxides obtained in Examples 4 and 5 were 15 nm or less (13 nm or less) both after the preparation and after the thermal reduction, indicating that the composite metal oxides were made of sufficiently fine particles and that the fine particle diameters were sufficiently maintained after the thermal reduction. From these results, it can be understood that cerium oxide, praseodymium oxide, and aluminum oxide were mixed in a state where these oxide were each extremely highly dispersed in the composite metal oxides obtained in Examples 4 and 5. Note that, since cerium oxide, praseodymium oxide, and aluminum oxide were mixed in a state where these oxides were extremely highly dispersed in a composite metal oxide as described above, amounts of cerium atoms and praseodymium atoms exposed on crystal surfaces were presumably increased in the composite metal oxide of cerium oxide and praseodymium oxide. Presumably because of this, the oxygen release in the reduction step and the hydrogen generation and reoxidation in the oxidation step easily proceeded. The present inventors speculate that, because of this, the hydrogen production catalysts comprising the composite metal oxides obtained in Examples 4 and 5 achieved the amounts of hydrogen generated at sufficiently high levels. In addition, the present inventors speculate that since cerium oxide and praseodymium oxide were in a highly dispersed state in the composite metal oxides obtained in Examples 4 and 5, a strong interaction was generated between cerium oxide and praseodymium oxide. In addition, the present inventors speculate that, because of the inclusion of alumina, particle growth of cerium oxide and praseodymium oxide was sufficiently suppressed owing to the barrier of the alumina, so that the interaction is retained. The present inventors speculate that, also because of this, the hydrogen production catalysts comprising the composite metal oxides obtained in Examples 4 and 5 achieved the amounts of hydrogen generated at sufficiently high levels.

On the other hand, the values of the average primary particle diameters of the composite metal oxide obtained in Comparative Example 9 were 12 nm or less both after the preparation and after the thermal reduction, indicating that the composite metal oxide was made of sufficiently fine particles, and the fine particle diameter was sufficiently maintained even after the thermal reduction. However, the composite metal oxide obtained in Comparative Example 9 resulted in an insufficient amount of oxygen released in the reduction step. Regarding this point, the present inventors speculate the amount of oxygen released in the reduction step was insufficient because of the following reason. Specifically, the thermal reduction step did not proceed sufficiently because the composite metal oxide obtained in Comparative Example 9 did not comprise praseodymium oxide, and hence the interaction between cerium oxide and praseodymium oxide as described above was not obtained.

<Pore Volume Measurement A>

The composite metal oxides obtained in Examples 1, 3, and 4, and Comparative Example 9 were each subjected to a calcination treatment in the air at 1100° C. for 5 hours. Then, a nitrogen adsorption isotherm curve of each of the composite metal oxides subjected to the calcination treatment was obtained by the constant-volume gas adsorption method under a condition of the liquid nitrogen temperature (−196° C.) by using an automatic specific surface area/pore distribution measuring apparatus (manufactured by Quantachrome Instruments under the trade name of "Autosorb-1"). Note that, after the calcination treatment, each of the composite metal oxides was subjected to a vacuum degassing treatment at 120° C. for 2 hours before the measurement. A pore diameter distribution curve was obtained from the obtained nitrogen adsorption isotherm curve by the BJH method, and then the total pore volume of pores having pore diameters in a range from 1 nm to 0.1 μm was determined form the pore diameter distribution curve. Table 4 shows the obtained results.

<Pore Volume Measurement B>

The composite metal oxides obtained in Examples 1, 3, and 4 and Comparative Example 9 were each subjected to a calcination treatment in the air at 1100° C. for 5 hours. Then, a pore diameter distribution curve of each of the composite metal oxides subjected to the calcination treatment was obtained by using a mercury porosimeter (manufactured by Quantachrome Instruments under the trade name of "Pore-Master 60GT"), and the total pore volume of pores having pore diameters in a range from 0.1 μm to 10 μm was determined from the obtained pore diameter distribution curve. Table 4 shows the obtained results.

TABLE 4

| | Pore volume (Unit: cm³/g) | |
|---|---|---|
| | 1 nm to 0.1 μm (mesopores) | 0.1 to 10 μm (macropores) |
| Example 1 | 0.03 | 0.01 |
| Example 3 | 0.08 | 0.01 |
| Example 4 | 0.44 | 0.90 |
| Comp. Ex. 9 | 0.26 | 0.46 |

As is apparent from the results shown in Table 4, it was found that the pore volume of the composite metal oxide obtained in Example 4 was remarkably larger than those of the composite metal oxides obtained in Examples 1 and 3. From these results, it can be understood that the hydrogen production catalyst comprising the composite metal oxide obtained in Example 4 had many mesopores and macropores formed by aggregation of primary crystal particles of cerium oxide, praseodymium oxide, and aluminum oxide. In consideration of these results and the above-described results of the amounts of hydrogen generated in combination, the hydrogen production catalyst comprising the composite metal oxide obtained in Example 4, which had a total pore volume of mesopores of 0.18 cm³/g or more and a total pore volume of macropores of 0.2 cm³/g or more, obviously had sufficiently large numbers of mesopores and macropores. The present inventors speculate that, because of this, diffusion of oxygen molecules and water molecules to the crystal surfaces of cerium oxide and praseodymium oxide in the catalyst was promoted, and the amount of hydrogen generated was sufficiently improved. On the other hand, as is apparent from the results shown in Table 4, it was found that the composite metal oxide obtained in Comparative Example 9 also had a pore volume almost equal to that of the composite metal oxide obtained in Example 4. However, the present inventors speculate that since the thermal reduction step did not proceed sufficiently as described above because of the absence of praseodymium oxide in the composite metal oxide obtained in Comparative Example 9, the amount of oxygen released in the reduction step was insufficient.

From the above-described results, it was found that the hydrogen production catalysts (Examples 1 to 5) of the present invention comprising the composite metal oxides of cerium oxide and praseodymium oxide were capable of producing hydrogen more sufficiently efficiently than the catalyst (Comparative Example 1) comprising only cerium oxide, the catalyst (Comparative Example 2) comprising only praseodymium oxide, and the catalysts (Comparative Examples 3 to 9) comprising other composite metal oxides. Furthermore, it was found that the hydrogen production catalysts (Examples 1 to 5) were capable of sufficiently producing hydrogen even under a temperature condition of 800° C. or below. In addition, the hydrogen production catalysts of the present invention (Examples 1 to 5) are capable of sufficiently generating hydrogen even in a relatively low reaction temperature region of 900° C. or below, and hence makes it possible to sufficiently reduce the ratio of thermal energy loss from the reaction vessel due to heat dissipation, thermal radiation, and the like, when compared with conventional hydrogen production catalysts which require higher temperature conditions (for example, the catalysts described in Non-Patent Literatures 1 and 2). Hence, it was found that the hydrogen production catalysts (Examples 1 to 5) of the present invention had sufficiently high conversion efficiencies of thermal energy to hydrogen, which is an energy medium. Furthermore, it was found that, in the cases (Examples 4 and 5) where the composite metal oxides of cerium oxide and praseodymium oxide further comprised aluminum oxide, and the values of the average primary particle diameters were 15 nm or less (13 nm or less) both after the preparation and after the thermal reduction, or in the case (Example 4) where the composite metal oxide took a state where large numbers of mesopores and macropores existed even after the calcination treatment was performed in the air at 1100° C. for 5 hours, the hydrogen production catalysts (Example 4 to 5) comprising the composite metal oxides exhibited higher levels of activities, and were capable of producing hydrogen more sufficiently.

As described above, the present invention makes it possible to provide a hydrogen production catalyst which makes it possible to efficiently perform a thermal reduction step and an oxidation step of the catalyst and produce hydrogen efficiently and reliably in a relatively low-temperature region of 900° C. or below, as well as a method for producing hydrogen and a hydrogen production apparatus using the hydrogen production catalyst. As described above, the hydrogen production catalyst of the present invention makes it possible to produce hydrogen efficiently and reliably even in a relatively low-temperature region. Hence, the hydrogen production catalyst of the present invention is particularly useful as a catalyst used in a method for producing hydrogen utilizing a two-step thermochemical water splitting reaction involving oxidation and reduction reactions of cerium, or the like.

Hereinafter, a list of the reference numerals is described (Explanation of Reference Numerals).
10: hydrogen production catalyst
11: reaction vessel 12: water supply means
13: inert gas supply means
14: exhaust pipe
A1: direction in which gas flows
A2: direction in which steam flows
A3 to A5: directions in which gas flows
P: piping
V1 to V3: valves
110: homogenizer
111: rotor
112: outer stator
113: inner stator
114: rotation shaft
115: motor
116A, 116B: nozzles
117A, 117B: flow paths (supply pipes)
120: reaction vessel
A: reaction solution
B: reaction solution
X: axis of rotation
Y: plane perpendicular to axis X of rotation

What is claimed is:

1. A hydrogen production catalyst for generating hydrogen, the catalyst comprising a composite metal oxide of cerium oxide and praseodymium oxide, the catalyst being effective to thermochemically split water,
wherein the composite metal oxide has a fluorite-type crystal structure and an average primary particle diameter of the composite metal oxide is in the range of 15 nm or less after being heated in an inert gas atmosphere at 800° C. for 1 hour.

2. The hydrogen production catalyst according to claim 1, wherein a content ratio of the cerium oxide and the praseodymium oxide in the composite metal oxide is in the range of 95:5 to 5:95 in terms of an atomic ratio ([cerium]:[praseodymium]) of the metal elements.

3. The hydrogen production catalyst according to claim 1, wherein the composite metal oxide further comprises aluminum oxide.

4. The hydrogen production catalyst according to claim 3, wherein a content of the aluminum oxide is in the range of 5 to 50% by mass relative to a total amount of the cerium oxide, the praseodymium oxide, and the aluminum oxide.

5. The hydrogen production catalyst according to claim 1, wherein the composite metal oxide satisfies the following conditions:
a total pore volume of pores having pore diameters in a range from 1 nm to 0.1 μm measured by a nitrogen adsorption method is in the range of 0.18 cm$^3$/g or more after being calcined in air at 1100° C. for 5 hours, and
a total pore volume of pores having pore diameters in a range from 0.1 μm to 10 μm measured by a mercury intrusion method is in the range of 0.2 cm$^3$/g or more after being calcined in air at 1100° C. for 5 hours.

6. The hydrogen production catalyst according to claim 1, wherein the specific surface area of the composite metal oxide is in the range of 1 to 200 m$^2$/g.

7. The hydrogen production catalyst according to claim 6, wherein the specific surface area of the composite metal oxide is in the range of 62 to 200 m$^2$/g.

8. A method for producing hydrogen by thermochemically splitting water using a hydrogen production catalyst comprising a composite metal oxide of cerium oxide and praseodymium oxide wherein the composite metal oxide has a fluorite-type crystal structure, the method comprising:
thermally reducing the composite metal oxide; and
splitting water by bringing water into contact with the reduced composite metal oxide to thereby generate hydrogen and oxidize the composite metal oxide,
wherein an average primary particle diameter of the composite metal oxide is in the range of 15 nm or less after being heated in an inert gas atmosphere at 800° C. for 1 hour.

9. The method for producing hydrogen according to claim 8, wherein the composite metal oxide is thermally reduced in an inert gas atmosphere under a temperature in the range of 400 to 900° C.

10. The method for producing hydrogen according to claim 8, wherein during the splitting, the water is brought into contact with the composite metal oxide under a temperature in the range of 50 to 600° C.

11. A hydrogen production apparatus, comprising:
a hydrogen production catalyst configured to generate hydrogen, the catalyst comprising a composite metal oxide of cerium oxide and praseodymium oxide wherein the composite metal oxide has a fluorite-type crystal structure, the catalyst being effective to thermochemically split water;
a reaction vessel configured to receive the hydrogen production catalyst;
a water supplier connected to the reaction vessel, the water supplier configured to supply water into the reaction vessel;
an inert gas supplier connected to the reaction vessel, the inert gas supplier configured to supply an inert gas into the reaction vessel;
an exhaust pipe connected to the reaction vessel, the exhaust pipe configured to discharge gas in the reaction vessel; and
a heater configured to heat the inside of the reaction vessel, wherein
the reaction vessel, is configured to (i) thermally reduce the composite metal oxide and (ii) split water by bringing water into contact with the reduced composite metal oxide to thereby generate hydrogen and oxidize the composite metal oxide, and
an average primary particle diameter of the composite metal oxide is in the range of 15 nm Of less after being heated in an inert gas atmosphere at 800° C. for 1 hour.

12. The hydrogen production apparatus according to claim 11, wherein the heater heats the inside of the reaction vessel by utilizing heat of sunlight.

* * * * *